(12) United States Patent
Vo et al.

(10) Patent No.: US 8,139,761 B2
(45) Date of Patent: Mar. 20, 2012

(54) NETWORK INTERFACE DEVICE, APPARATUS, AND METHODS

(75) Inventors: Chanh C. Vo, Keller, TX (US); Rodger A. Tenholder, Saginaw, TX (US); John J. Napiorkowski, Irving, TX (US)

(73) Assignee: Corning Cable Systems LLC, Hickory, NC (US)

( * ) Notice: Subject to any disclaimer, the term of this patent is extended or adjusted under 35 U.S.C. 154(b) by 1847 days.

(21) Appl. No.: 11/320,031

(22) Filed: Dec. 28, 2005

(65) Prior Publication Data
US 2007/0160195 A1    Jul. 12, 2007

(51) Int. Cl.
*H04M 1/00* (2006.01)
(52) U.S. Cl. .............................. 379/413.04; 379/413.03
(58) Field of Classification Search .............. 379/399.01–413.04; 439/188, 439/397, 409, 646, 678, 709, 869, 879
See application file for complete search history.

(56) References Cited

U.S. PATENT DOCUMENTS

| | | | |
|---|---|---|---|
| 5,153,910 A | 10/1992 | Mickelson et al. | 379/399 |
| 5,333,193 A | 7/1994 | Cote et al. | 379/399 |
| 5,416,837 A | 5/1995 | Cote et al. | 379/399 |
| 5,479,505 A | 12/1995 | Butler et al. | 379/412 |
| 5,497,416 A | 3/1996 | Butler, III et al. | 379/399 |
| 5,541,376 A * | 7/1996 | Ladtkow et al. | 200/284 |
| 5,548,641 A | 8/1996 | Butler et al. | 379/399 |
| 5,575,680 A * | 11/1996 | Suffi | 439/404 |
| 5,595,507 A * | 1/1997 | Braun et al. | 439/716 |
| 5,671,273 A | 9/1997 | Lanquist | 379/399 |
| 5,901,220 A * | 5/1999 | Garver et al. | 379/399.01 |
| 5,980,303 A * | 11/1999 | Lee et al. | 439/405 |
| 6,152,760 A * | 11/2000 | Reeser | 439/409 |
| 6,265,680 B1* | 7/2001 | Robertson | 200/293 |
| 6,500,020 B2* | 12/2002 | Vo et al. | 439/409 |
| 6,560,334 B1* | 5/2003 | Mullaney et al. | 379/413.04 |
| 6,839,428 B2* | 1/2005 | Brower et al. | 379/413.04 |
| 6,914,976 B2* | 7/2005 | Bloemen | 379/325 |
| 7,118,405 B2* | 10/2006 | Peng | 439/417 |
| 2001/0029125 A1* | 10/2001 | Morita et al. | 439/397 |

OTHER PUBLICATIONS

International Application published under the Patent Cooperation Treaty, International Publication No. WO 2007/079074 A3, Jul. 12, 2007, 4 pages.

* cited by examiner

*Primary Examiner* — Fan Tsang
*Assistant Examiner* — Akelaw Teshale
(74) *Attorney, Agent, or Firm* — John H. Vynalek

(57) ABSTRACT

A line module includes a plurality of pivoting insulation displacement connector holders, an insulation connector (IDC) positionable in at least one holder when the holder is in a connected position, and a gel-less jack in electrical communication with at least one IDC.

7 Claims, 33 Drawing Sheets

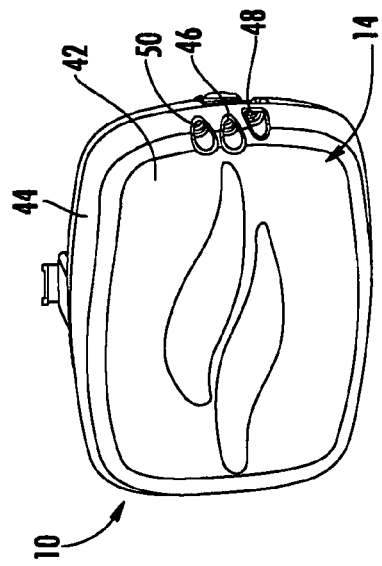
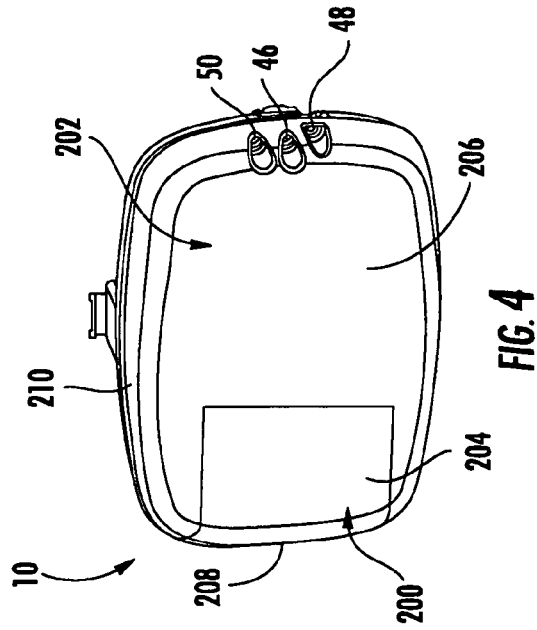
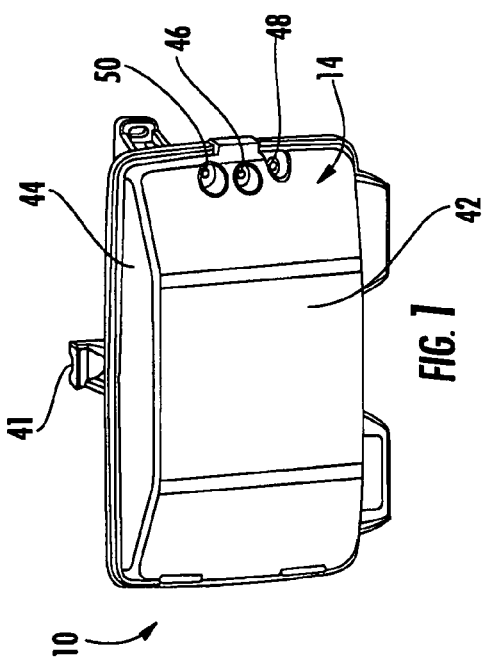
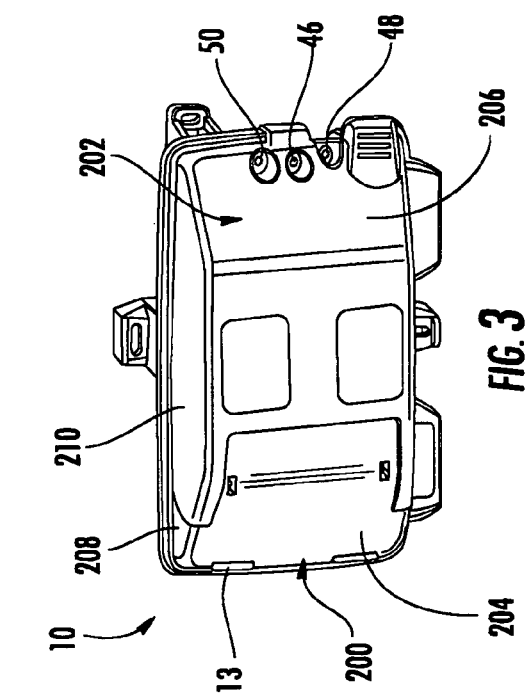

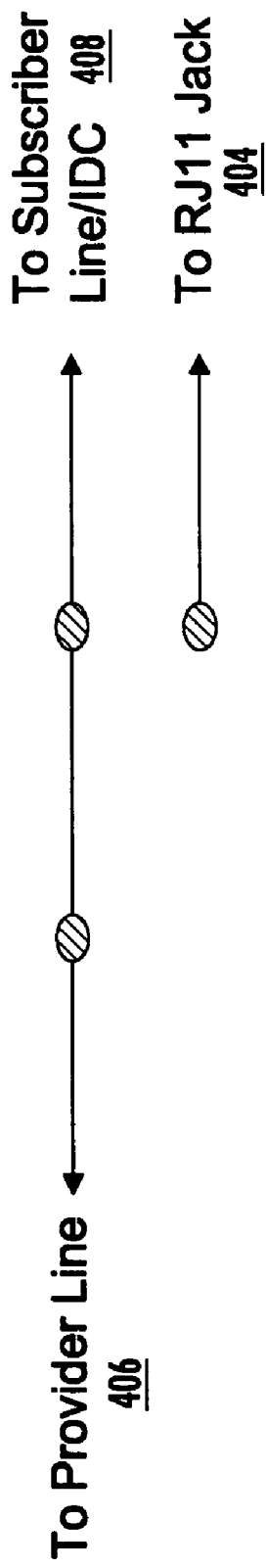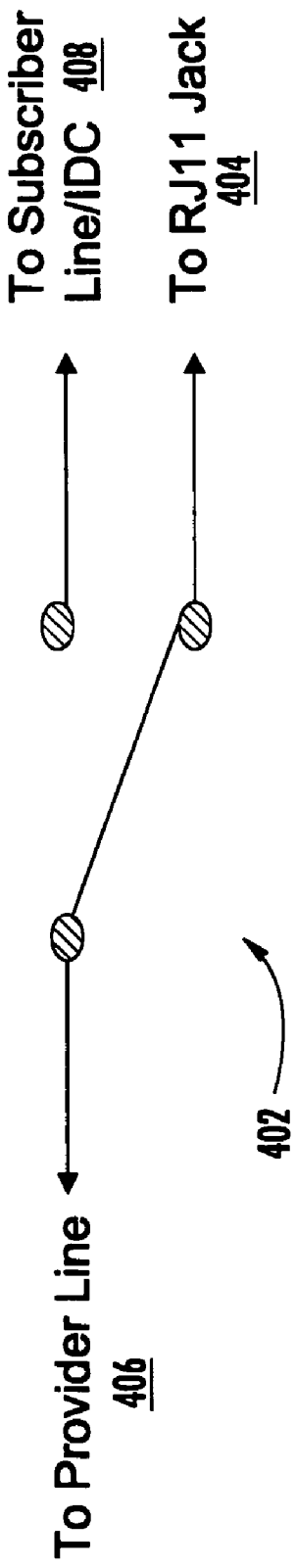
FIG. 16A
FIG. 16B

NETWORK INTERFACE DEVICE, APPARATUS, AND METHODS

BACKGROUND OF THE INVENTION

1. Field of the Invention

The present invention relates generally to a network interface device used in a telecommunications network, and more specifically, to a universal network interface device capable of accommodating conventional line modules and protectors and including independent subscriber and telecommunications service provider access. More generally, the present invention relates to telecommunications and, more particularly, to equipment useful at subscriber demarcation points.

2. Technical Background

Telephone service is provided by a telephone company ("provider") to a number of different customers of the provider, commonly referred to as "subscribers." Each subscriber may purchase as many separate telephone lines as desired and equip his or her home or business with various types of telephone equipment. Subscribers are responsible for proper operation of the telephone equipment and the provider is responsible for proper operation of the telephone network up to the interface between the provider wiring and the subscriber wiring.

Therefore, it is desirable to provide a telephone network interface device ("NID") to serve as a demarcation point between the provider wiring and the subscriber wiring. NIDs serve the function of isolating the provider portion of the system or wiring from that of the respective subscribers. Such isolation is desirable in order to segregate the responsibility for faults or malfunctions that may occur in the respective parts of the system.

In practice, known NID designs are typically mounted to an exterior wall of a house or building. Conventional NIDs generally include a container or housing, the interior of which is divided into a provider portion and a subscriber portion. Provider wiring typically enters the NID and terminates in the provider portion. The provider portion also typically contains protective devices to protect equipment and users from excess voltages. The subscriber wiring typically enters the NID and terminates in the subscriber portion. At least one interconnect apparatus is located between the two portions and generally operates to connect the subscriber wiring to the provider wiring.

Outer covers are typically provided for the respective housing portions that permit only provider access to the provider portion of the housing and both provider and subscriber access to the subscriber portion thereof. In such housings of the prior art, the covers are pivotally mounted to the housing. Disadvantageously, in such housings of the prior art, a provider technician attempting to gain access to the terminating equipment and wiring of the provider portion, must perform a two step procedure: first opening the subscriber portion and second opening the provider portion. Only by performing this two-step procedure can full access be obtained. Accordingly, one aspect of the invention requires improvements that provide a one step overriding access feature to the provider portions of the NID.

The housing of known NID designs typically includes at least one routing means for routing provider and subscriber lines into the interior of the NID. These routing means generally include an entry port having a conventional grommet disposed therein. The grommet is typically provided with a punch out pattern allowing a provider technician to punch out a portion of the grommet and insert a provider or subscriber line. However, the use of conventional grommet designs suffer the disadvantage of having at least a portion of the grommet tear off during insertion. With a portion of the grommet torn off, an effective seal against environmental contaminants is no longer provided.

As used herein, the term "interconnect apparatus" or "terminating device" is intended to include any type of known connector for interconnecting service provider wiring with subscriber wiring, configured with or without a protection element for protecting against a voltage and/or current surge, including but not limited to a line module, a protected terminating device ("PTD"), or the like.

Known interconnect apparatus are typically a modular device that can be mounted in the subscriber portion of the NID and easily replaced if rendered inoperable. Prior art terminating devices, such as line modules, typically include a housing and a cover that can pivot between a closed position and an open position. The housing of the line module includes a pair of insertion channels that allow the provider wires to be electrically coupled with a pair of contacts located in an integrated jack. The jack is typically a conventional RJ-11 jack. The cover may be connected to the line module by a hinge so that the cover can be rotated away from the housing of the line module to permit access to the jack. As mentioned, the jack has a pair of contacts that are electrically coupled to the tip and ring wires.

Likewise, the plug attached to the cover has a complementary pair of conductors that make contact with the jack contacts when the plug is engaged in the jack. The subscriber wires are connected to a pair of terminals provided on a portion of the line module known as the bridge. The plug conductors are also electrically coupled to the terminals. Thus, when the cover is closed, an electric circuit is completed between the provider wires and the subscriber wires. When the cover is opened, the subscriber wires are disconnected from the provider wires. However, a test plug can be plugged into the jack to determine if the provider wires up to the line module are conducting properly. The bridge is removable, and thus, replaceable if rendered inoperable. However, the line module may also be provided with a non-removable bridge. Existing and known interconnecting apparatus suffer the disadvantage of not being capable of being employed in various NID designs. As such, it is desired for an improved interconnect apparatus that is capable of deployment in various NID types.

Accordingly, there is a specific and unresolved need for a low cost universal network interface device having advantageous features including a protective outer cover having an integrated override feature operable for permitting a provider technician to gain access to provider portions and/or subscriber portions of a NID in one step. There is also an additional need for an improved sealing structure at the cable entry points on the NID, thus providing improved sealing around provider or subscriber lines entering the interior of the NID through a defined entry port. Further, there is a need in the art for a universal network interface device capable of accommodating conventional line modules and protectors of various types and sizes, and particularly for accommodating an improved line module having a locking mechanism for preventing unauthorized access to the electrical connections housed within the terminating device.

SUMMARY OF THE INVENTION

In one aspect, the present invention is directed to a universal network interface device containing comprehensive modifications directed to improvements in the design, fabrication and utilization of such equipment. The network interface device generally includes a base and a protective outer cover movably attached thereto. The base is preferably manufactured from a low cost ABS or PVC material having desired properties and the outer cover is preferably manufactured from a PBT material that meets and/or exceeds existing network equipment-building system (NEBS) requirements.

In another aspect, the base of the NID generally defines an interior cavity for receiving the terminating equipment and wiring connections. The interior cavity is further defined by a provider portion and a subscriber portion. The base includes a perimeter wall which has at least one recess formed therein to form at least one entry port. Each entry port is configured to permit provider and/or subscriber lines to be routed into the NID. The entry ports are preferably provided with a sealing means or grommet to prevent contaminants, such as moisture, dirt, dust, and infestations, from entering the NID when the entry port is not in use or when a provider or subscriber line is utilized that is smaller in diameter than the entry port.

The NID further includes a partition having an inner cover forming part thereof and an opening forming the remainder. The inner cover is sized to correspond to and positioned over the provider portion of the NID. The opening is sized to correspond to and positioned over the subscriber portion. The partition is configured to be releasably secured and movably attached to the base of the NID between a closed position and an opened position by a locking screw that requires an industry specific tool to remove it. Accordingly, in the closed position, the inner cover of the partition prevents unauthorized access to the provider portion of the NID. The partition may be attached to the base by a series of hinges located along one side of the base and the partition, thereby causing the partition to pivot about the hinges between the closed position and the opened position. In the open position, access to the provider portion is provided. Since the partition is releasably secured to the base, the inner cover shields the provider portion from unauthorized access, while permitting access to the subscriber portion.

The partition and the protective outer cover are preferably provided with a subscriber access means having a locked and an unlocked position located opposite the hinges at a desired location for locking the outer cover to the partition. A locking feature operable for receiving a combination or key lock (not shown) belonging to the subscriber may also be provided. The locking feature may be recessed within the NID such that it is less conspicuous. The subscriber access means permits the subscriber to gain access to the terminating equipment and wiring connections contained within the interior subscriber portion when necessary or desired by actuating the subscriber access means to an unlocked position and manipulating the outer cover into the open position and accessing the subscriber portion through the opening.

The NID is also preferably provided with a provider override means for securing the partition and the outer cover to the base in the closed position or opening the NID in its entirety, thereby exposing both the provider portion and subscriber portion. The provider override means is configured to pass through the outer cover and the partition and be fastened directly to the base. In the open position, the partition and the outer cover remain locked together by the subscriber access means. Accordingly, the provider override means permits a provider technician from the communications service provider to by-pass the subscriber access means and the locking feature, and thereby gain access to the interior contents of the NID in one step.

In yet another aspect, the present invention is directed to a universal NID including a novel sealing mechanism. The sealing mechanism is preferably a grommet made of an elestomeric material and generally includes a grommet holder for securing the grommet in place within an entry port of the NID. The grommet holder includes a pair of generally cylindrical guide posts for slidable engagement with a channel defined by the entry port of the NID. Preferably, the grommet is provided with at least one grommet port operable for receiving at least one provider or subscriber line and routing the same into the interior of the NID. The grommet port includes a punch out pattern for insertion of lines from the provider or the subscriber's equipment. More preferably, however, the grommet is provided with at least one grommet port having a flexible wave like shape such that the grommet port stretches when a line from the provider or subscriber equipment is inserted and thereafter sealingly surrounds the line.

In yet another aspect, the present invention is directed to a network interface device capable of accommodating a variety of terminating devices, including an improved terminating device or line module for interconnecting provider lines with subscriber lines including a locking feature. The improved terminating device generally includes a base and a customer bridge mounted on the base, and is typically connected to a stuffer assembly. Generally, the customer bridge includes a base and a cover that is hingeably attached to the base. The cover of the customer bridge is equipped with a locking feature. The locking feature includes a locking slide that cooperates with a movable latch. The latch includes an upper portion, a lower portion and has a concave recess for cooperating with a subscriber lock. The upper portion of the latch is adapted to be captured by a notch of the locking slide and the lower portion of the latch is adapted to be captured by a catch of the base, thereby locking the cover to the base. In order to open the cover, a subscriber will have to remove the subscriber lock and manipulate the latch such that the notch and catch no longer capture the upper and lower portions of the latch. Alternatively, the locking slide will have to be slid into an open position, thereby allowing the latch to be moved such that the notch and catch no longer capture the relevant portions.

For added security, a wall of the inner cover of the NID is configured to overlie closely and abut the locking slide, thereby preventing substantial lateral movement of the locking slide and keeping the cover in the closed position. Thus, when in the closed position, only the removal of the subscriber lock will permit the cover of the customer bridge to be opened. When the inner cover is no longer positioned to have the wall overlie and closely abut the locking slide, the cover may be opened with the locking arm of the subscriber lock captured within the latch by sliding the locking slide to the open position and moving the latch such that the lower portion is no longer captured by the catch of the base. In the event that an unauthorized person forces open the cover of the line module, the lower portion of the latch and the locking slide will be broken off leaving a visual indication of tampering.

In other aspects and alternative embodiments, the outer cover of the network interface device may include two sections, a provider cover and a subscriber cover. The provider cover and the subscriber cover are movably connected to each other by hidden hinges, such that the subscriber cover pivots about the provider cover into an open position, thereby exposing the subscriber portion of the NID. Further, the provider cover may be movably attached to the base by a series of hinges located along one side of the base and the provider cover. The provider cover is defined by the size of the provider portion and is preferably configured to fit closely about the base.

The subscriber cover is movably attached to the provider cover and is defined by the size of the subscriber portion. The subscriber cover is provided with a subscriber access means having a locked and an unlocked position. The subscriber access means is locked in the closed position to the provider cover, thereby forming a closed outer cover. The subscriber access means is configured to permit the subscriber to gain access to the interior of the subscriber portion of the NID only.

The NID may also be provided with a provider override means opposite the hinges for securing the provider cover to the base in the closed position or opening the NID in its entirety thereby exposing both the provider portion and subscriber portion. The provider override means is preferably configured to pass through the provider cover to the base. More preferably, the provider override means is operable for unlocking both the subscriber cover and the provider cover in one step. In the open position, the subscriber cover and the provider cover remain locked together by the subscriber access means.

In another aspect a Network Interface Device (NID) component is provided. The component includes a base configured to receive, in a cavity, both a subscriber wire contact and a provider wire contact, and a cover in movable attachment to said base, the cover including a bridge contact, wherein the bridge contact makes electrical connection between the subscriber wire contact and the provider wire contact when the cover is in a closed position and breaks the electrical connection when in an open position.

In yet another aspect, a Network Interface Device (ND) component system is provided, wherein the component system includes a subscriber line module (SLM) configured to be mounted in a first NID configuration without an adapter, and an adapter configured to be attached to the SLM to make the SLM mountable in a second NID configuration different from the first configuration.

In another aspect of the invention a protector module includes a ground bar adapter movable from one side of the module to another side of the module.

In another aspect of the invention a line module is provided. The line module includes a plurality of pivoting insulation displacement connector holders, an insulation displacement connector (IDC) positionable in at least one holder when the holder is in a connected position, and a gel-less jack in electrical communication with at least one IDC.

In another aspect of the invention a Network Interface Device (NID) component is provided. The component including a base part configured to receive a subscriber wire and a provider wire, a cover in movable attachment to the base, wherein an electrical connection between the subscriber wire and the provider wire is provided when the cover is in a closed position and the electrical connection is disconnected when in the cover is in an open position, and a gel-less jack on the cover.

Additional features and advantages of the invention are set out in the detailed description which follows, and in part will be readily apparent to those skilled in the art from that description or recognized by practicing the invention as described herein, including the detailed description which follows, as well as the appended drawings.

It is to be understood that both the foregoing general description and the following detailed description present exemplary embodiments of the invention, and are intended to provide an overview or framework for understanding the nature and character of the invention as it is claimed, and not for reasons of limitation. The accompanying drawings are included to provide a further understanding of the invention, and are incorporated into and constitute a part of this specification. The drawings illustrate various embodiments of the invention, and together with the detailed description, serve to explain the principles and operations thereof, and are not provided for reasons of limitation.

BRIEF DESCRIPTION OF THE DRAWINGS

FIG. 1 is a front elevation view of the universal network interface device constructed in accordance with this invention and shown with a tapered outer cover in the closed position.

FIG. 2 is a front elevation view of the universal network interface device constructed in accordance with this invention and shown with a smooth, convex outer cover in the closed position.

FIG. 3 is a front elevation view of the universal network interface device constructed in accordance with this invention and shown with a split, tapered outer cover in the closed position.

FIG. 4 is a front elevation view of the universal network interface device constructed in accordance with this invention and shown with a split, smooth convex tapered outer cover in the closed position.

FIG. 16 illustrates a method of bypassing a jack in a Network Interface Device (NID) component.

DETAILED DESCRIPTION OF THE INVENTION

Figure 5:
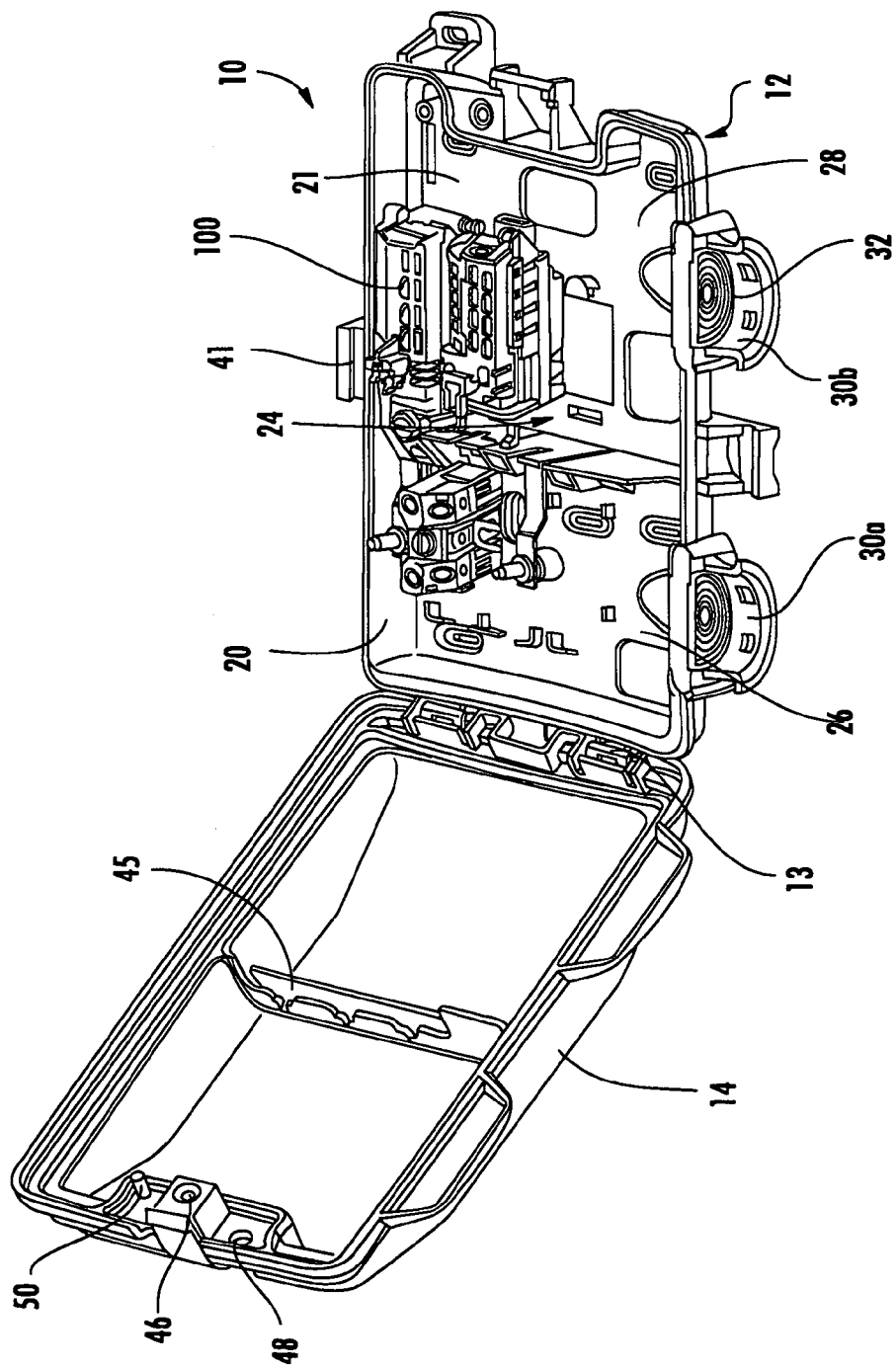
FIG. 5 is a schematic view of the universal network interface device constructed in accordance with this invention and shown with a tapered outer cover in the opened position.

Reference will now be made in detail to several exemplary embodiments of the invention, and examples of which are illustrated in the accompanying drawings. Whenever possible, the same reference numerals will be used throughout the drawings to refer to the same or like parts. Various embodiments of a universal network interface device are shown throughout the figures and are designated generally by reference number 10.

Throughout this description, positional terms, such as left, right, top, bottom, front, rear, side, etc., and relative terms, such as larger, smaller, nearer, farther, etc., are utilized herein for purposes of explanation only, and as such, should not be construed as limiting the scope of the invention or the appended claims in any manner. In the embodiments shown, the universal network interface device 10 is capable of accommodating various examples of line modules and protectors now known or hereafter devised. The network interface devices shown and described herein are particularly well suited for installations in which restricted access to terminating equipment and wiring connections belonging to the provider is desired.

The present invention provides a universal network interface device (hereinafter referred to as a "NID") of the type commonly used in communications networks. The NID 10 acts a housing for a demarcation point between the wiring of a communication service provider (hereinafter "provider") and the wiring of a subscriber's equipment. Since the NID 10 acts as a housing for a demarcation point, it is preferred that the device also provide a means for permitting access to provider portions of the NID 10 only or subscriber portions and provider portions of the wiring within the housing.

Further, it is preferred that the NID 10 include an integrated override feature operable for permitting the provider to access its wiring and equipment directly. Still further, it is preferred that the NID 10 include an improved sealing means for preventing environmental contaminants from entering the interior of the NID 10. Still further, it is preferred that the NID 10 be configured and adapted to receive various terminating devices including an improved terminating device having a locking mechanism operable for preventing unauthorized access to the terminating device's electrical connections or wiring.

Referring now to FIGS. 1, and 5-7, a NID is shown and indicated generally at 10, and is constructed in accordance with one aspect of the invention. The NID 10 includes a base 12 that is generally rectangular in shape and a corresponding protective outer cover 14 that is movably attached to the base 12, thereby forming a closure. The base 12 and the outer cover 14 may be manufactured from any relatively rigid material, such as sheet metal, but preferably are made of a molded plastic, such as acrylonitrile butadiene styrene (ABS), polyvinyl chloride (PVC), polyethylene, polypropylene, polycarbonate, or polybutylene terephthalate (PBT).

More preferably, since the base 12 is affixed to the outside of a building or the like it may be constructed from a low cost ABS- or PVC-type material having desired properties. Further, as the outer cover 14 is attached to the base 12 and is exposed to various stresses during operation, i.e. opening and closing, it is preferably constructed from a PBT-type material. The provision of using two distinct materials in the construction of the NID is such that an overall low cost design is provided while meeting and/or exceeding existing network equipment-building system (NEBS) requirements set forth by Telcordia Technologies (Bellcore). Specifically, the use of the PBT-type material for the outer cover 14 is operable for providing a greater tensile strength and a greater flexural strength to the NID during mold stress tests. By way of example, the outer cover 14 may be made of Valox® 3706, a semi-crystalline, thermoplastic polyester resin based on PBT polymers available from the General Electric Co., of Fairfield, Conn.

Figure 6:
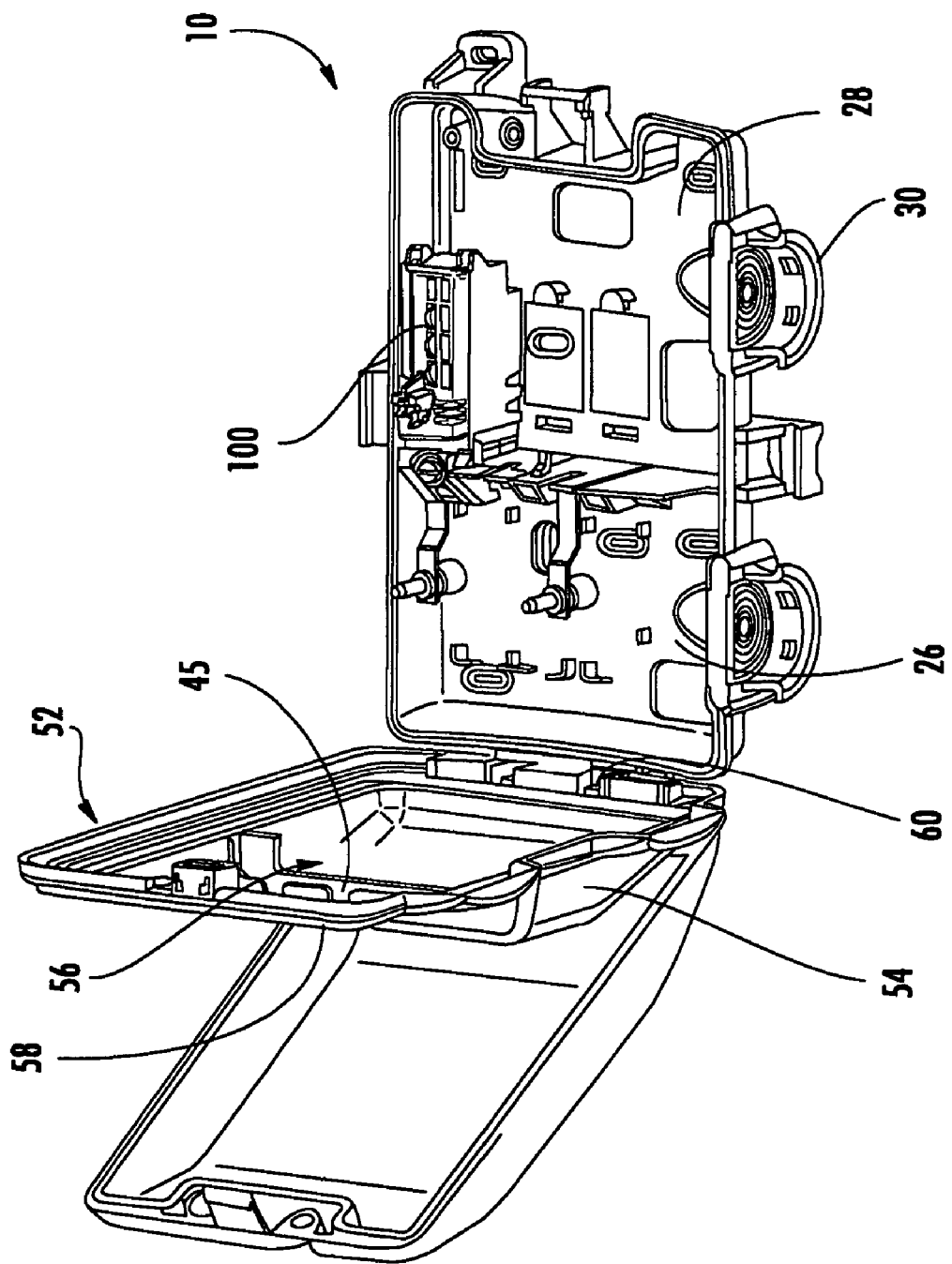
FIG. 6 is a schematic view of the universal network interface device constructed in accordance with this invention and shown with a tapered outer cover and a partition having an inner cover in the open position.

The base 12 of the NID 10 includes a back wall 21 (FIG. 5) and a perimeter wall 20 depending upwardly along the periphery of the back wall 21. Together, the back wall 21 and the perimeter wall 20 of the base 12 define an interior cavity 24 for receiving the terminating equipment and wiring connections housed within the NID 10. The interior cavity 24 of the NID 10 is further defined by a provider portion 26 and a subscriber portion 28. The perimeter wall 20 preferably extends upwardly from the back wall 21 and has a corresponding recess 23 formed at the bottom thereof to form at least one entry port 30 (FIGS. 5-6).

Each entry port 30 is in communication with the interior cavity 24 defined by the base 12 to permit provider and/or subscriber lines to be routed into the NID 10. The NID 10 may be provided with any convenient number of entry ports 30 operable for receiving any number of provider or subscriber lines. Preferably, however, the NID 10 is provided with at least a first port for receiving a provider line from a communications network and a second port for receiving a subscriber line from a subscriber premises.

The entry ports 30 may be provided with a removable seal or cap (not shown). Preferably, however, the entry ports are provided with a sealing means to prevent contaminants, such as moisture, dirt, dust, and infestations, from entering the NID 10 when the entry port 30 is not in use or when a provider or subscriber line is utilized that is smaller in diameter than the entry port 30. Preferably, the sealing means is a grommet 32. It will be understood by those skilled in the art that the grommet 32 is made from any suitable elastomeric material operable for withstanding environmental hazards, such as wind, rain, and/or snow.

Figure 8:
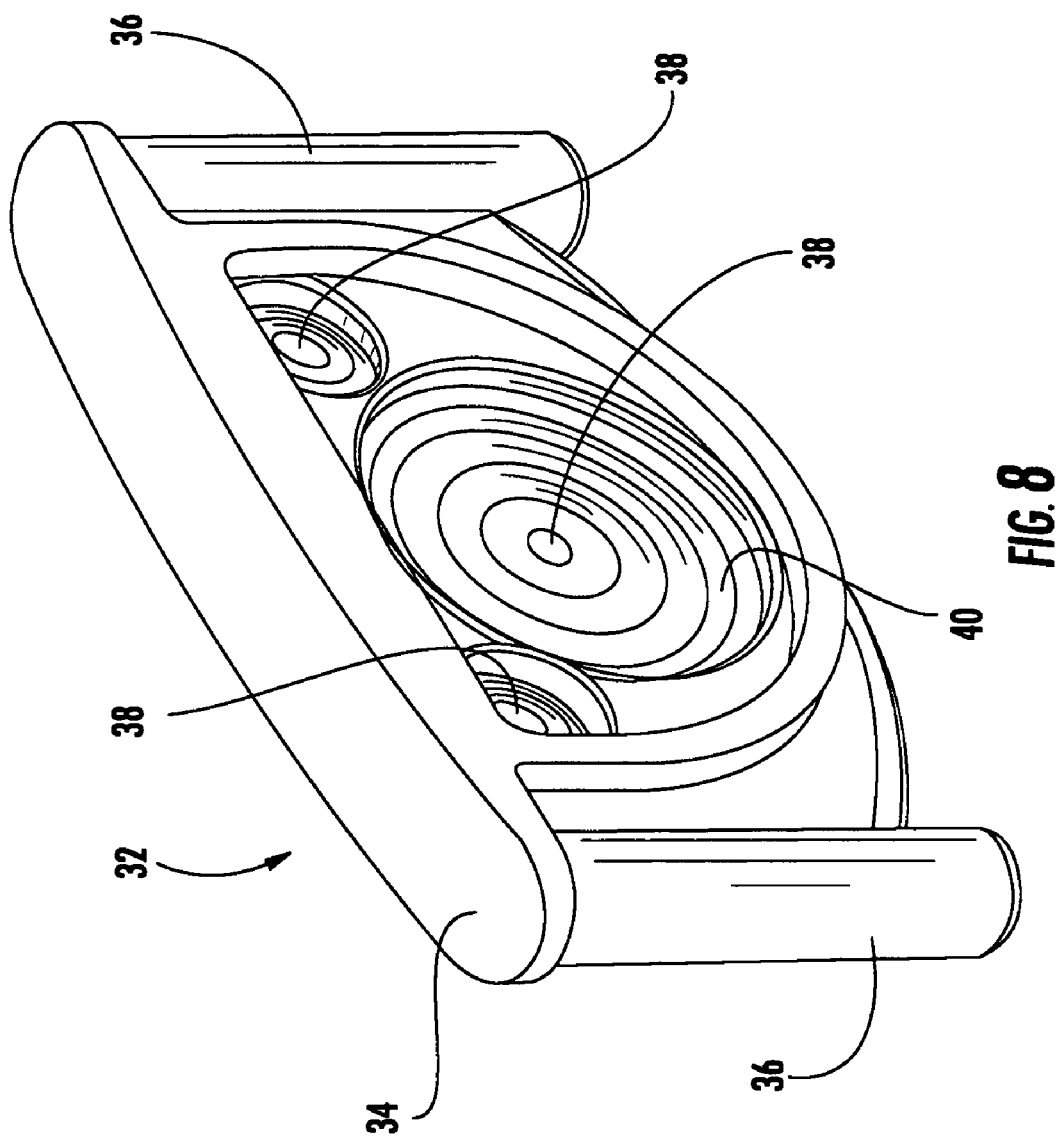
FIG. 8 is perspective view of the sealing means of FIG. 8 constructed in accordance with the present invention.
Figure 9:
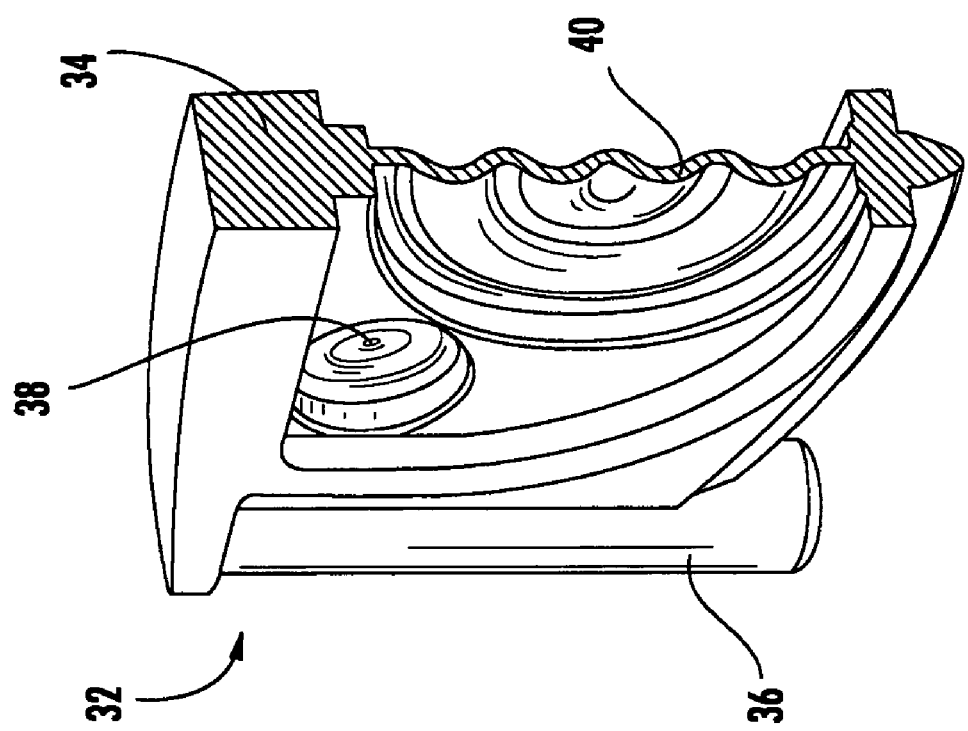
FIG. 9 is a sectional view of the sealing means of FIG. 8.

As shown in FIGS. 8-9, the grommet 32 includes a grommet holder 34 for securing the grommet 32 in place within the entry port 30. The grommet holder 34 includes a pair of generally cylindrical guide posts 36 for slidable engagement with a channel (not shown) defined by the entry port 30 of the NID 10. The guide posts 36 provide added security to the grommet 32 in the entry port 30 while lines from either the provider or subscriber are being inserted therein. Preferably, the grommet 32 may be provided with at least one grommet port 38 operable for receiving at least one provider or subscriber line. It will be understood by those skilled in the art that any number of grommet ports 38 may be used for receiving any number of lines having various diameters.

By way of example only, FIGS. 8-9 illustrate a grommet 32 having three grommet ports 38 operable for receiving either a provider or subscriber line, or both, of varying diameters. The grommet port 38 may include a punch out pattern for insertion of lines from the provider or the subscriber's equipment. More preferably, however, the grommet 32 is provided with at least one grommet port 38 having a flexible wave-like configuration 40 such that the grommet port 38 stretches when the line from the provider or subscriber equipment is inserted. In operation, a field provider technician may cut or punch out a small diameter portion of the grommet port 38 and insert a line therethrough. As the line enters the interior cavity 24 of the NID 10, the wave-like shape 40 of the grommet port 38 flexes or stretches and sealingly surrounds the line, thereby preventing undesirable contaminants from entering the NID 10.

When in use, the entry port 30 may also be sealed with a gel or grease around the line in a known manner to further prevent contaminants from entering the NID 10. As shown and described herein, a first port 30a for receiving a provider line is located adjacent a hinged side of the base 12 and outer cover 14, and a second port 30b for receiving a subscriber line is located adjacent the side of the NID 10 opposite the hinges 13. The first port 30a and the second port 30b, however, may be located at any convenient location relative to the interior cavity 24 of the NID 10. The first port 30a and the second port 30b may also be combined into a single entry port 30 for receiving both the provider lines and the subscriber lines.

Figure 7:
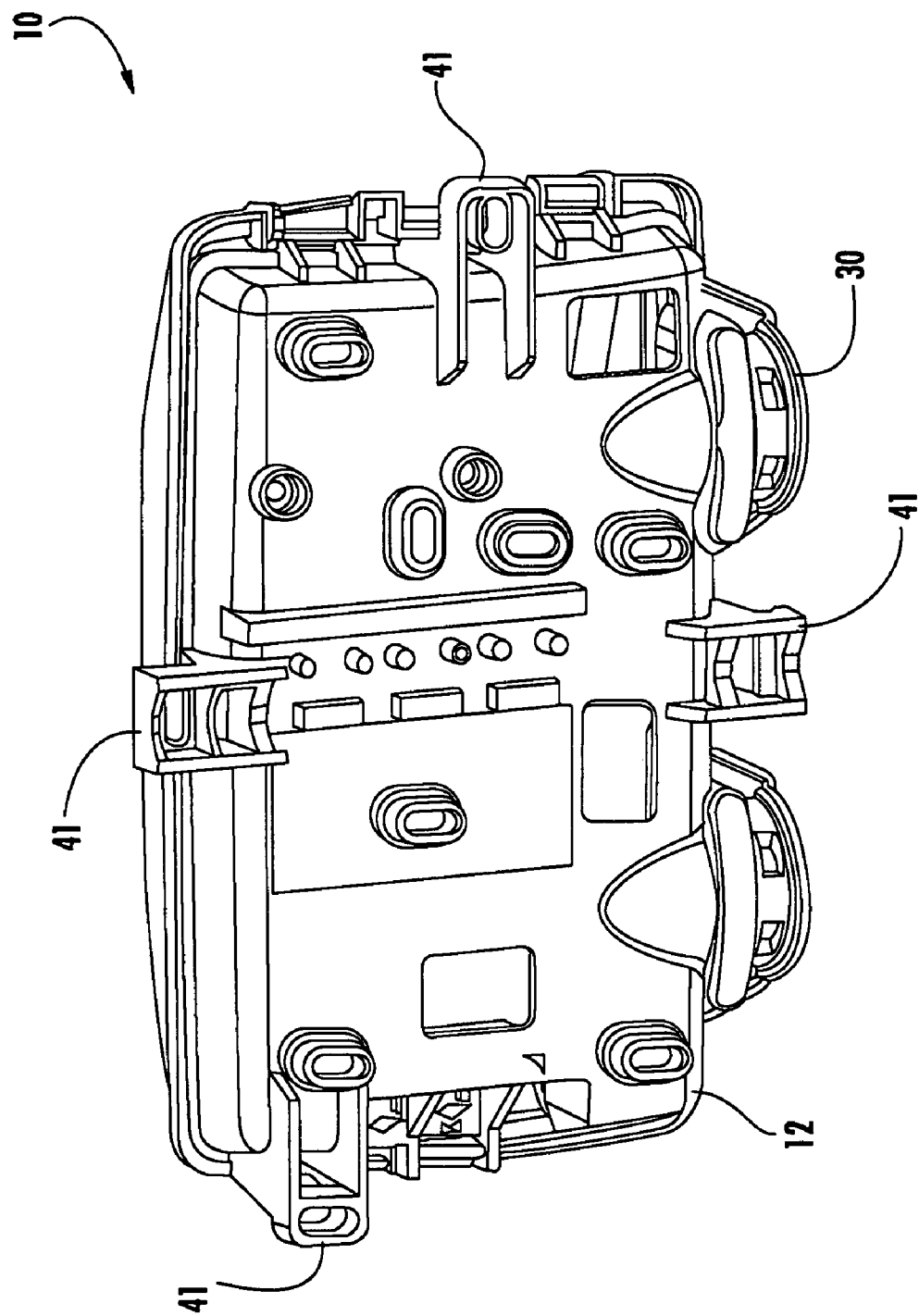
FIG. 7 is a back elevation of the universal network interface device constructed in accordance with this invention and shown with universal mounting features.

Referring now to FIG. 7, the base 12 may further include one or more feet 41 for mounting the NID 10 to a pole, wall or other building structure at the subscriber premises. Typically, the NID 10 is mounted outside the subscriber premises and the outer cover 14 locked on the base 12, as described herein, to prevent unauthorized access to the terminating equipment and the wiring connections housed within the NID 10. Note that there are a plurality of mounts 41 such that NID 10 is mountable to a variety of surfaces and in different orientations. For example, the mount 41 on top when looking at FIG. 7 allows for using that mount and it provides a self centering of NID 10. Additionally, the mounts on the left and right allow for other mounting orientations. Further, there is another mount on the bottom and as shown in FIG. 7, the NID 10 has a mount 41 on all four sides.

The outer cover 14 is movable between a closed position, as shown in FIG. 1, and an opened position, as shown in FIGS. 5-6. The outer cover 14 includes a front wall 42 and a perimeter wall 44 that meets and forms a closure with the perimeter wall 20 of the base 12 to prevent moisture and elements from entering. As best shown in FIG. 1, the front wall 42 of the outer cover 14 has a generally tapered configuration. However, as shown in FIG. 2, it will be understood by those skilled in the art that the outer cover 14 may be constructed of a perimeter wall 44 and a smooth type front wall 42. In either case, the outer cover 14 may be movably attached to the base 12 in any suitable manner, but preferably is attached to a partition 52 by a series of hinges 13 located along one side of the base 12 and the outer cover 14.

Figure 10:
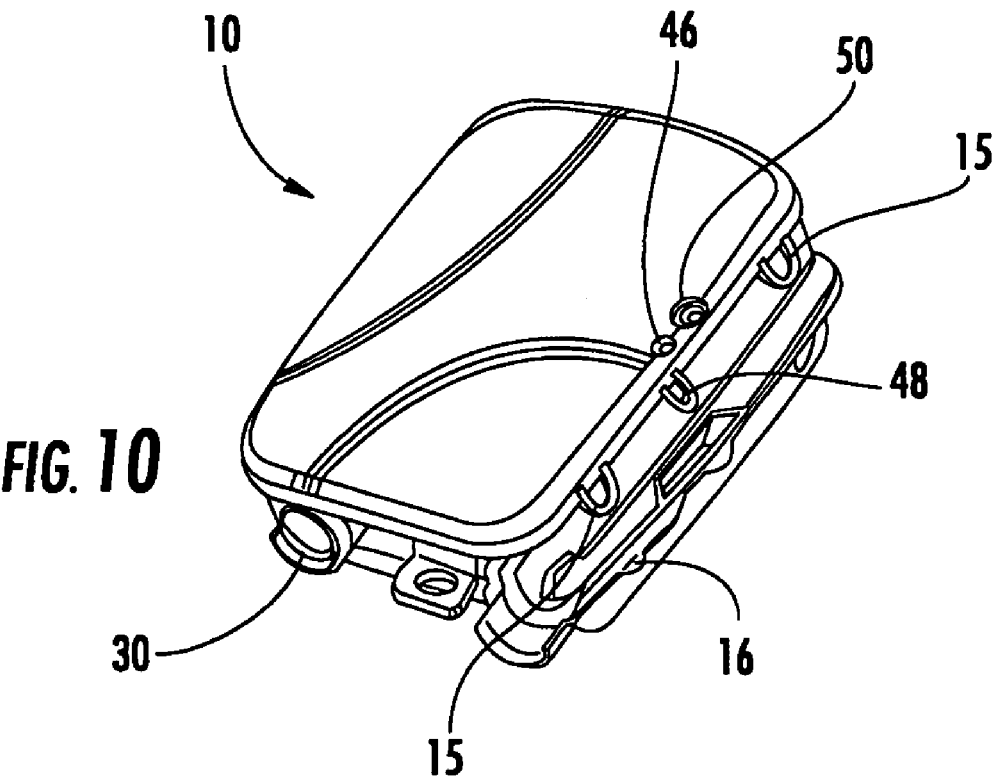
FIG. 10 is a front elevation view of the universal network interface device constructed in accordance with this invention and shown in the closed position with a recessed subscriber lock on the outer cover.
Figure 11:
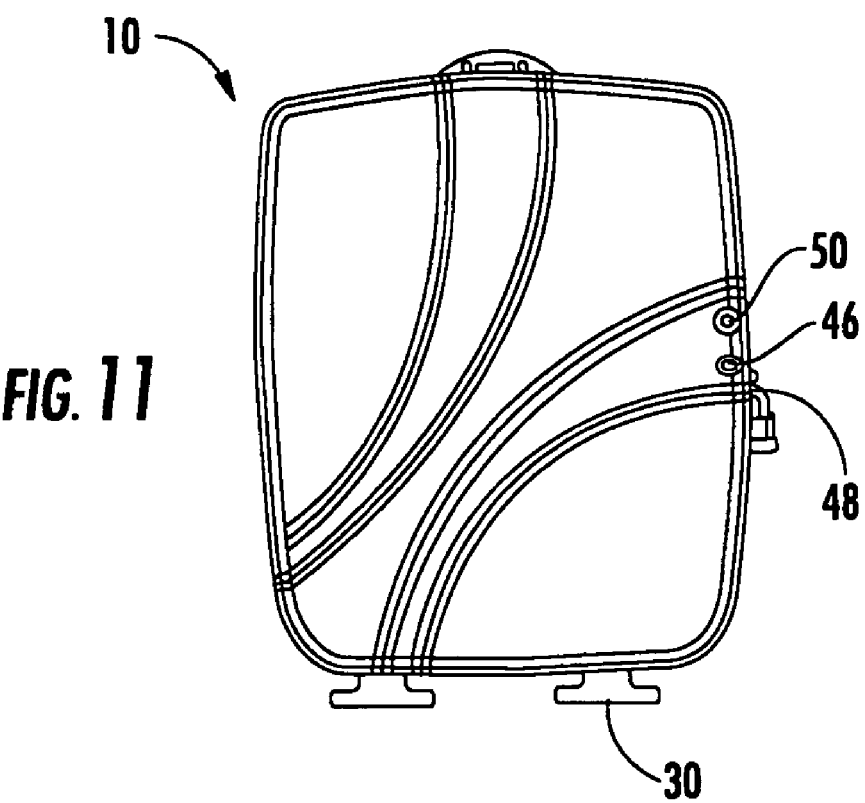
FIG. 11 is a perspective view of the universal network interface device constructed in accordance with this invention and shown with a recessed subscriber locking feature on the outer cover.

Accordingly, the outer cover 14 pivots about the hinges 13 between the closed position and the opened position to provide access to the interior cavity 24 of the NID 10. As best shown in FIGS. 10-11, the base 12 may optionally be provided with hooks 15 and the outer cover 14 may be provided with snaps 16 that are received within the hooks 15 to secure the outer cover 14 on the partition 52 in the closed position. Also, the subscriber cover can be attached to and pivot from either the base or the provider cover.

As shown in FIG. 5, the NID 10 further includes a partition 52 having an inner cover 54 forming part thereof and an opening 56 forming the remainder. The inner cover 54 is sized to correspond to and positioned over the provider portion 26 of the termination equipment and the wiring connections belonging to the provider that is housed within the interior cavity 24. The opening 56 is sized to correspond to and positioned over the subscriber portion 28 having termination equipment belonging to the subscriber such that either a provider technician or the subscriber can access the termination equipment and wiring within the NID 10.

Further, the opening 56 is defined by a continuous rim 58 that extends from the inner cover 54 and runs coextensive with the edge of perimeter wall 20 of the base 12. More preferably, the rim 58 is configured to accept a sealing gasket on either side thereof for preventing outside contaminants from entering the NID 10. As stated hereinabove, the inner cover 54 of the partition 52 is defined by the size of the provider portion 26 of the base 12 and is preferably configured to fit closely within the base 12 and outer cover 14. Further, the partition 52 is preferably manufactured of a low cost thermoplastic material and in preferred embodiments does not need to provide shielding against electromagnetic signals. However, it will be understood by those skilled in the art that the inner cover may be constructed to provide such protection.

The partition 52 is configured to be releasably secured and movably attached to the base 12 of the NID 10 between a closed position and an opened position. For example, a locking screw that requires an industry specific tool to remove it may be utilized to releasably secure the partition 52 to the base 12. Accordingly, in the closed position, the inner cover 54 of the partition 52 prevents unauthorized access to the provider portion 26 of the terminating equipment and the wiring connections belonging to the service provider that is housed within the interior cavity 24 of the NID 10.

Furthermore, the partition 52 may be attached to the base 12 by a series of hinges 60 located along one side of the base 12 and the partition 52. Accordingly, the partition 52 pivots about the hinges 60 between the closed position and the opened position to provide access to the provider portion 26 and the subscriber portion 28 of the NID 10. In addition, access to the subscriber portion 28 of the terminating equipment and wiring connections belonging to the subscriber is not obstructed by the inner cover 54, when in the closed position, the subscriber can access the wiring through the opening 56.

Since the partition 52 is releasably secured to the base 12, the inner cover 54 shields the provider portion 26 from unauthorized access, while permitting access to the subscriber portion 28. The partition 52 and the outer cover 14 may be provided with a subscriber access means 46 having a locked and an unlocked position and being located opposite the hinges 13 at a desired location along the rim 58 for locking the outer cover 14 on the partition 52. Preferably, the subscriber access means 46 includes a locking screw (not shown) that requires an industry specific tool to remove it.

A locking feature 48 including aligned openings through the partition 52 and the outer cover 14 operable for receiving a combination or key lock (not shown) belonging to the subscriber may also be provided for additional security. As best shown in FIG. 11, the locking feature 48 may be recessed within the NID 10 such that it is less conspicuous. The subscriber access means 46 permits the subscriber to gain access to the terminating equipment and wiring connections contained within the interior subscriber portion 28 of the NID 10 when necessary or desired by actuating the subscriber access means 46 to an unlocked position and manipulating the outer cover 14 into the open position and accessing the subscriber portion 28 through the opening 56.

The NID 10 may also be provided with a provider override means 50 opposite the hinges 13 for securing the partition 52 and the outer cover 14 to the base 12 in the closed position or opening the NID 10 in its entirety thereby exposing both the provider portion 26 and subscriber portion 28. Preferably, the provider override means 50 includes a locking screw (not shown) that requires an industry specific tool to remove it. However, it will be understood by those skilled in the art that any locking mechanism suitable for securing the outer cover 14, the partition 52 and the base 12 may be employed.

The locking screw of the provider override means 50 is preferably configured to pass through the outer cover 14 and the partition 52 and be fastened directly to the base 12. In the open position, the partition 52 and the outer cover 14 remain locked together by the subscriber access means 46. Accordingly, the provider override means 50 permits a provider technician from the communications service provider to bypass the subscriber access means 46 and the locking feature 48 belonging to the subscriber, and thereby gain access to the terminating equipment and wire connections of the interior cavity 24 of the NID 10. Specifically, by actuating the provider override means 50, a provider technician may manipulate the outer cover 14 and partition 52 to the open position thereby gaining access to both the provider portion 26 and subscriber portion 28 of the NID 10 when it is necessary to service, repair, or reconfigure the NID 10.

Unlike conventional NID designs, which require that the subscriber portion 28 be accessed independently from the provider portion 26, the use of the provider override means 50 provides a one step method of accessing the provider portion 26 and the subscriber portion 28 of the NID 10.

As referenced above, the NID 10 is capable of accommodating various interconnect apparatus. Further, the universal NID 10 disclosed herein may also include at least one improved terminating device for interconnecting provider lines with subscriber lines. An enlarged detail of a terminating device 100 constructed in accordance with one aspect of the present invention is shown in FIGS. 12-15. The terminating device 100 may be any apparatus or device for interconnecting provider lines with subscriber lines, such as a subscriber line module ("SLM"), protected terminating device ("PTD"), or the like.

For purposes of example only and not for limitation, the terminating device shown and described herein is a line module 100 that is housed within the NID 10 to serve as the demarcation point between the provider lines and the subscriber lines in the telecommunications network. The line module 100 generally includes a base 102 and a customer bridge 104 mounted on the base 102, and is typically connected to a stuffer assembly 109. The customer bridge 104 is commonly referred to in the art as an interconnect module, a connector module, or a wiring module. As used herein, the term "customer bridge" is intended to include any apparatus for terminating wiring in a communications network, including but not limited to, an interconnect module, a connector module, a wiring module, or a customer bridge.

Generally, the customer bridge 104 includes a cover 106 that is movable between a first, opened position and a second, closed position. The cover 106 is provided with a plug that engages a jack formed on the upper surface of the base 102 when the cover is in the closed position. The jack includes test contacts disposed thereon that engage the contacts of an RJ-11 plug of a conventional telephone handset in a known manner to test for the presence of a telephone "dial tone" on the communications network.

Since the NID 10 is typically mounted on an exterior wall of an office, apartment, commercial, or residential building, a home, or the like, the line module 100 is susceptible to access by individuals that are not authorized to utilize the telephone service. As will be described in greater detail hereinafter, the terminating device of the invention deters the theft of telephone service by unauthorized individuals and protects the communications network and the subscriber's equipment from damage caused by excessive moisture, such as a flood condition.

The customer bridge 104 houses at least one insulation displacement contact ("IDC") and a corresponding actuating arm for electrically connecting the subscriber wiring to the insulation displacement contact, and thus, to the terminating device. In operation, the actuating arm is placed in the "disconnect" position and the subscriber line is inserted into a wire insertion hole 124 of the corresponding IDC. The actuating arm is then moved from the "disconnect" position to the "connect" position to force the subscriber wiring into engagement with the IDC and thereby electrically connect the subscriber wiring to the customer bridge 104 of the line module 100.

Although the operation of only a single actuating arm, IDC and wire insertion hole 124 has been described herein, the customer bridge 104 may be provided with any number of wire insertion holes 124, insulation displacement contacts and corresponding actuating arms 120. As shown herein, the customer bridge 104 has a plurality, and more specifically four, pairs of wire insertion holes 124 and insulation displacement contacts, each pair corresponding to one of the four actuating arms 120. Accordingly, the customer bridge 104 may accommodate, for example, up to four twisted pair tip and ring wires from various subscriber telephone equipment.

As one of ordinary skill in the art will readily understand and appreciate, two or more conductive members are provided to electrically connect the insulation displacement contacts housed within the customer bridge 104 to corresponding subscriber tip and ring conductors disposed within the jack 120 formed in the base 102.

The base 102 is similarly provided with at least one insulation displacement contact and is attached to the stuffer assembly 109 for electrically connecting the provider lines to the line module 100. As is well known, each IDC has a pair of opposed, sharp edges for piercing any insulation that may be present on the service provider wiring. The stuffer assembly 109 generally includes a conventional stuffer box 108 and securing screw 112 that cooperates to force the provider lines into engagement with the IDC. The stuffer box 108 is positioned for vertical movement on a post that is internally threaded for receiving the externally threaded securing screw 112. The stuffer box 108 further has at least one test port 111 formed therein for receiving a test clip to verify the integrity of the electrical connection between the provider wiring and the IDC.

In one aspect, the IDC is electrically connected to a protector assembly. The protector assembly is in contact with a grounding box that slides into a portion of the stuffer assembly 109. The protector assembly is intended to conduct any over-voltages or current surges carried by the communications network to the grounding box as the grounding box is connected to earth ground upon installation of the NID 10. The terminating device including the protector assembly is commonly referred to as a "PTD", a protection device, or a protector.

In operation, the provider lines are inserted into horizontally disposed wire insertion passages formed in the stuffer box 108 and though an opening formed in the upper portion of the IDC. The external threads of the securing screw 112 engage the internal threads of the post to drive the stuffer box 108 downwardly against the provider wiring positioned in the opening. As a result, the provider lines are brought into engagement with the opposed, sharp edges of the IDC, thereby piercing any insulation surrounding the provider wiring and electrically connecting the provider wiring to the line module 100.

As one of ordinary skill in the art will readily understand and appreciate, two conductive members are provided to electrically connect the IDCs to corresponding provider tip and ring conductors disposed within the jack formed in the base 102. Accordingly, the insulation displacement contacts housed within the customer bridge 104 may be electrically connected to the IDCs by engaging the subscriber conductors and service provider conductors disposed in the jack, and thereby selectively interconnect the provider wiring with the subscriber wiring.

The cover 106 of the customer bridge 104 is also equipped with a locking feature. The locking feature includes locking slide 110 that cooperates with a movable latch 128. The locking feature has a shape and size that is smaller than known locking mechanisms for line modules such that it may fit and be employed in various NID designs and configurations.

Figure 12:
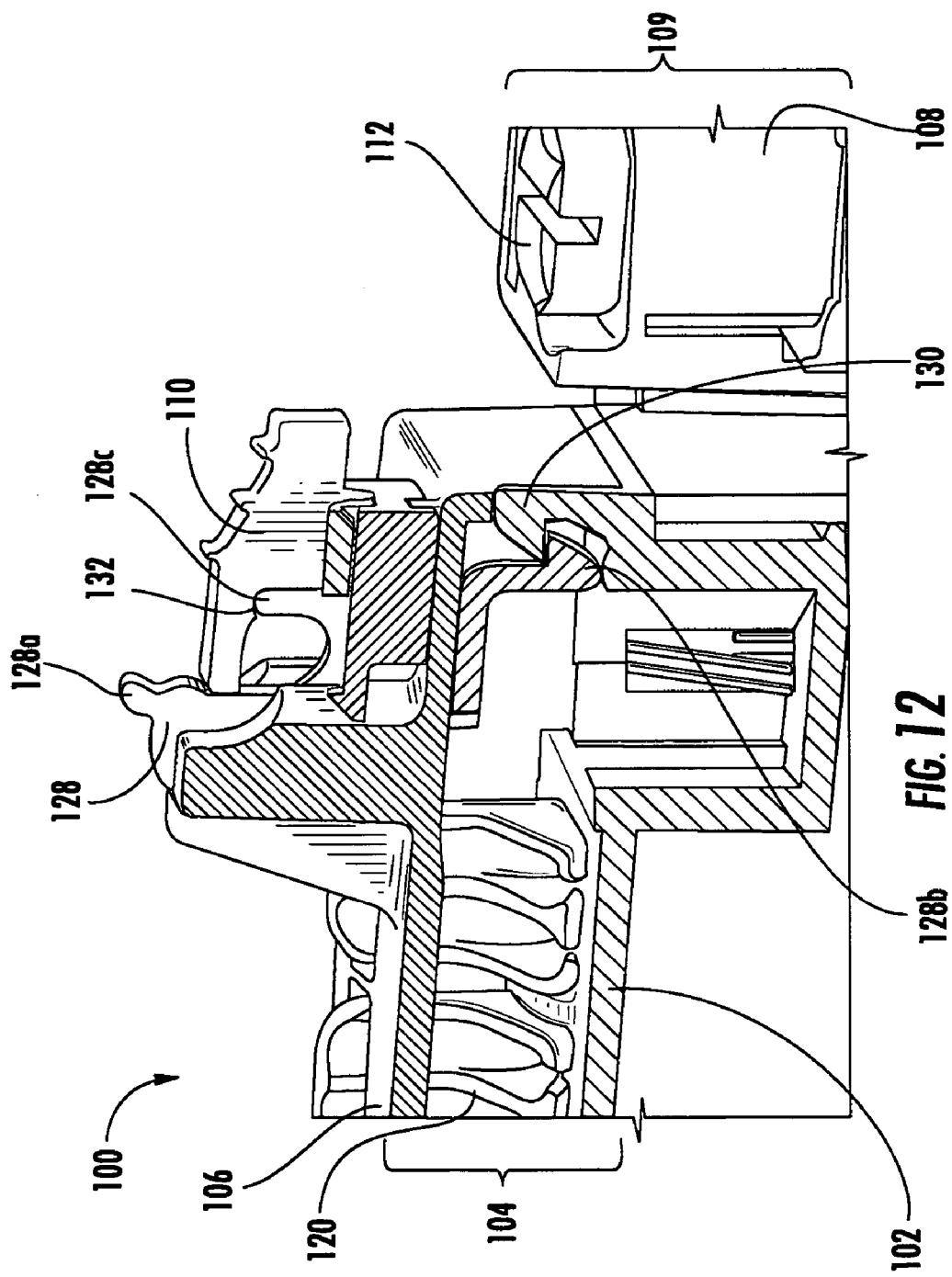
FIG. 12 is an enlarged perspective view of the interior of the NID of FIG. 1 illustrating a locking feature in the closed and locked position for deterring unauthorized access to the terminating device.
Figure 13:
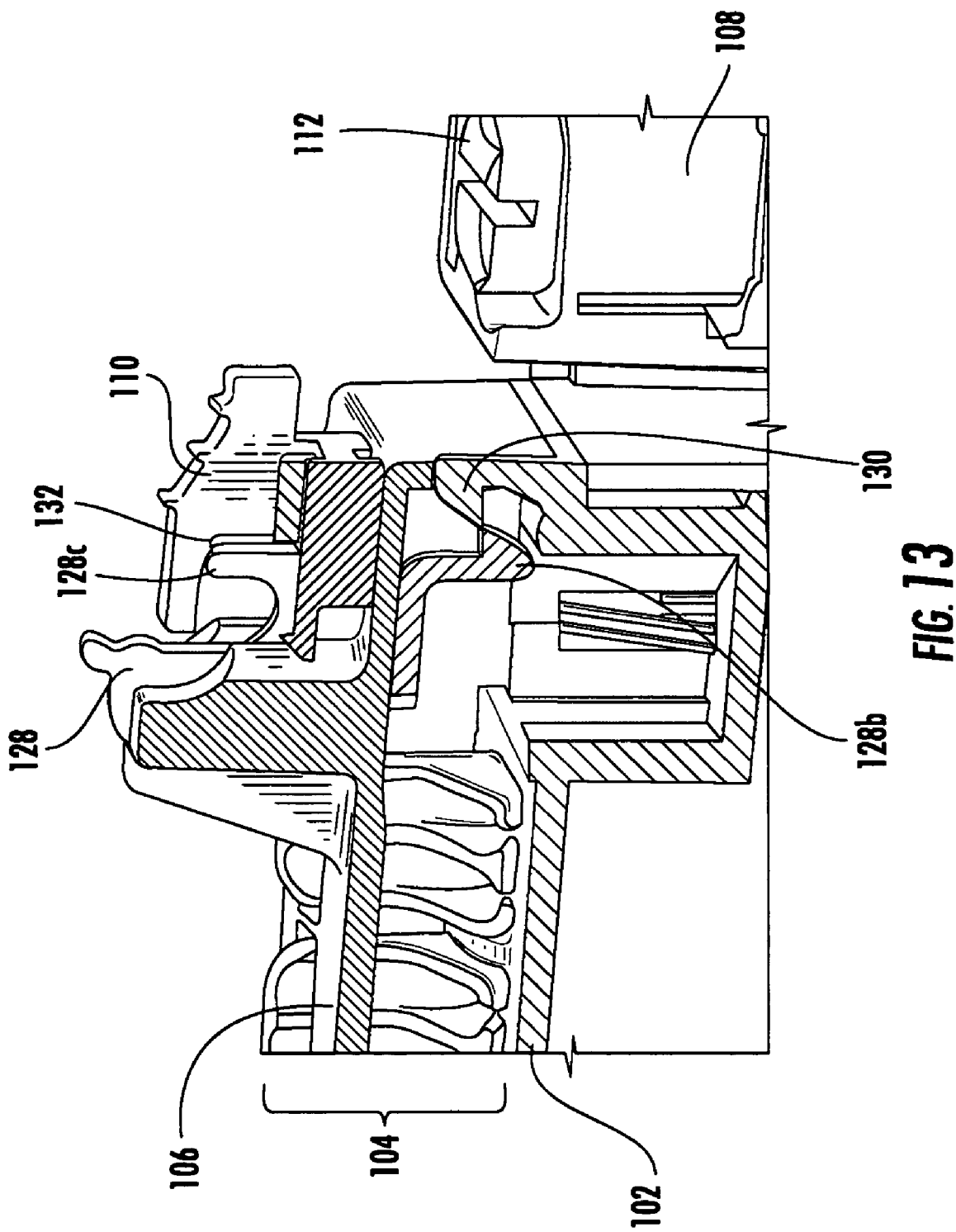
FIG. 13 is an enlarged perspective view of the interior of the NID of FIG. 1 illustrating a locking feature in the open and unlocked position for deterring unauthorized access to the terminating device.
Figure 14:
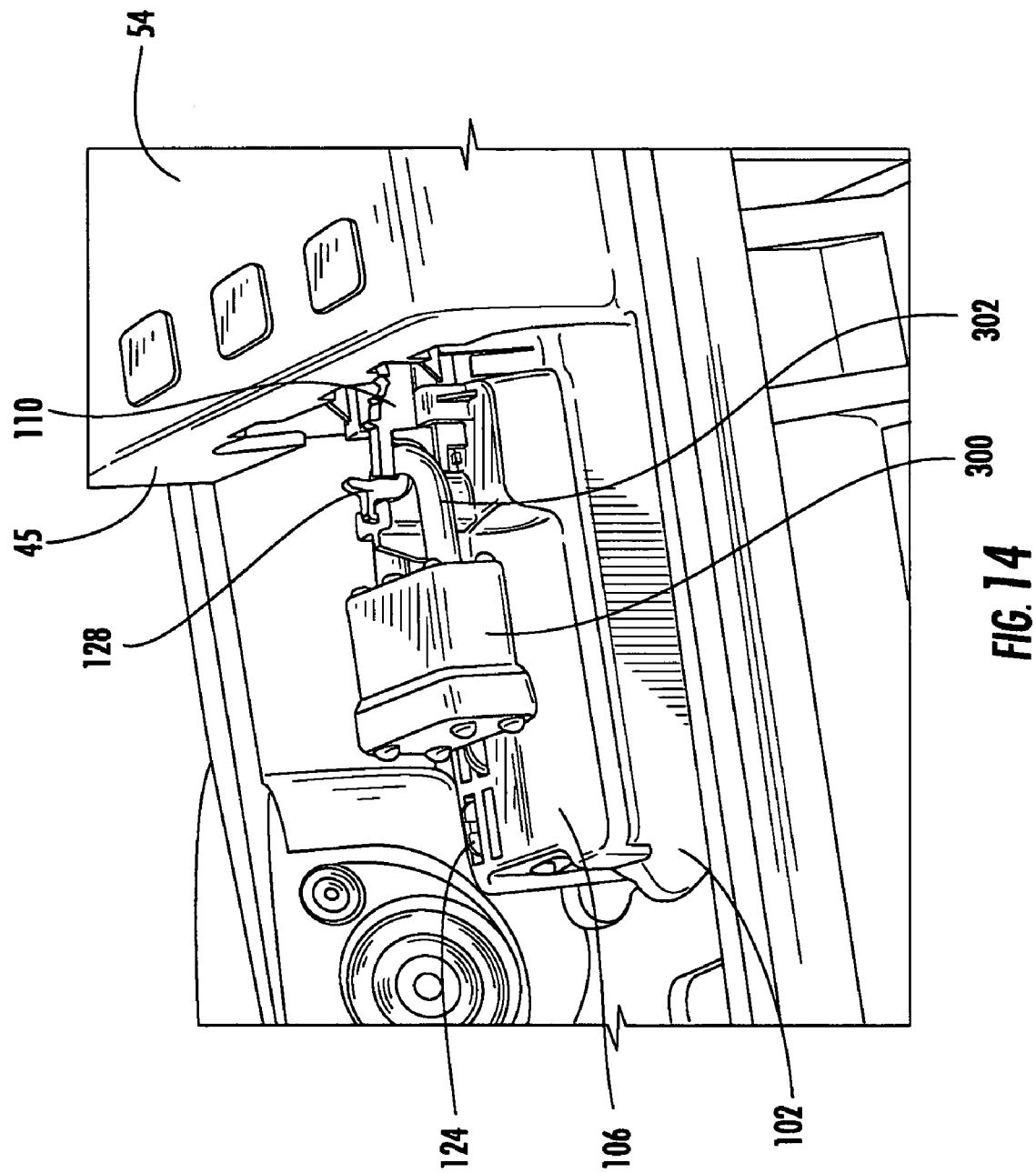
FIG. 14 is an enlarged detail view taken from FIG. 1 illustrating the closed and locked position of the cover of the terminating device and the partition and inner cover of the NID.
Figure 15:
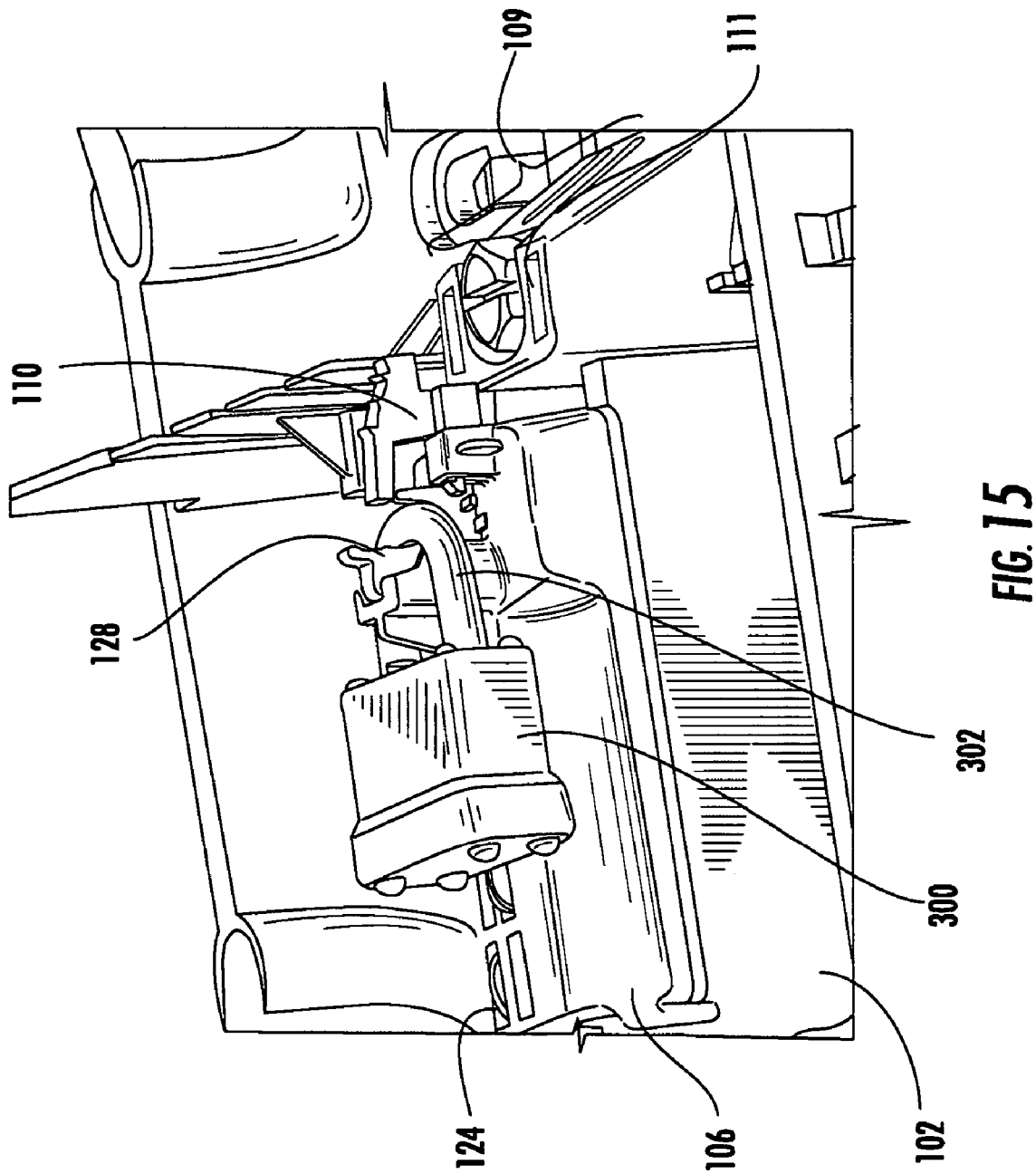
FIG. 15 is an enlarged detail view taken from FIG. 1 illustrating the open and unlocked position of the cover of the terminating device and the NID.

As shown in FIG. 12, the latch 128 has a concave recess for cooperating with a subscriber lock 300 (FIGS. 14-15). FIG. 14 illustrates the interaction between the inner cover 54 of a conventional NID 10 and the line module 100, and more specifically, the interaction between the inner cover 54 of the NID 10, the locking slide 110 of the line module 100, and the subscriber lock 300. The subscriber lock 300 deters unauthorized access to the line module 100, while permitting the subscriber and a provider technician from the provider to open the cover 106 of the line module 100 and access the actuating arms that connect and disconnect the subscriber wiring with the insulation displacement contacts housed within the customer bridge 104.

The provider technician must still be able to open the cover 106 of the line module 100 for purposes of testing the electrical connections between the subscriber wiring and the customer bridge 104 even if dispatched when the subscriber is not at the customer site. As best shown in FIG. 14, the perimeter wall 45 of the inner cover 54 overlies and closely abuts the locking slide 110. The perimeter wall 45 prevents substantial lateral movement of the locking slide 110. However, once the inner cover 54 is opened, the perimeter wall 45 no longer overlies and closely abuts the locking slide 110. Accordingly, the cover 106 may be opened with the locking arm 302 of the subscriber lock 300 captured within the latch 128.

The interaction between the perimeter wall 45 of the inner cover 54 of the NID 10, the locking slide 110 and the cover 106 of the line module 100 is illustrated in FIGS. 12-15. As discussed above, the locking arm 302 of a subscriber lock 300 may be captured within the concave recess of the latch 128. The latch 128 may then be positioned as shown in FIGS. 12 and 14.

In this position, the cover 106 cannot be opened because the latch 128 has a lower portion 128b that is captured beneath a catch 130 of the base 102 and an upper portion 128c that is captured beneath a notch 132 of the locking slide 110. In a NID 10 servicing multiple subscribers at the same site, such as an apartment or commercial building, an unauthorized person may attempt to open the cover 106 of the line module 100 to steal communications service. Once the cover 106 of the line module 100 is opened, the unauthorized person can insert the RJ-11 plug of a conventional telephone handset into the jack formed in the base 102 and utilize the communications service.

The subscriber lock 300 deters unauthorized use of the communications service. In the event that an unauthorized person forces open the cover 106 of the line module 100, the lower portion 128b of the latch 128 and the locking slide 110 will be broken off. The damage to the lower portion 128b of the latch 128 and the locking slide 110 provides a visual indication that an unauthorized person has attempted to gain access to the customer bridge 104 of the line module 100.

If a provider technician dispatched by the service provider needs to gain access to the customer bridge 104 of the line module 100, he will be able to open the inner cover 54 using a special tool that is typically available only to authorized personnel. As shown in FIG. 15, opening the inner cover 54 permits lateral movement of the locking slide 110. After laterally moving the locking slide 110, the upper portion 128c of the latch 128 is no longer overlapped by the notch 132. Further, with the lateral movement of the locking slide 110, the subscriber lock 300 may be removed and the latch 128 may be manipulated such that the lower portion 128b is no longer overlapped by the catch 130 of the base 102. Accordingly, the cover 104 will no longer be locked to the base 102. The cover 104 can then be opened.

Alternatively, the subscriber or a person authorized by the subscriber can remove the subscriber lock 300 and the latch 128 may be manipulated such that the lower portion 128b of the latch 128 is no longer overlapped by the catch 130. Accordingly, by manipulating the latch 128, the cover 106 is no longer locked to the base 102. The cover 106 can then be opened even though the locking slide 110 is still in the closed position.

As discussed above, the latch 128 is slidably captured by the notch 132 and the catch 130 of the base 102. The catch 130 is preferably integrally formed with the base 102, and the locking slide 110 is preferably integrally formed with the cover 106. The latch 128 further includes an upper surface 128a that is shaped and dimensioned to engage a user's fingertip. As previously described, the latch 128 also has a lower portion 128b. The lower portion 128b is relatively thin so as to fit comfortably beneath the catch 130.

The shape of the lower portion 128b provides sufficient surface area to ensure adequate contact with catch 130. Further, the attachment point between the lower portion 128b and the rest of the latch 128 is sufficiently small such that the lower portion 128b will snap off if an unauthorized person attempts to gain access to the line module 100 by forcing open the cover 106. Damage to the lower portion 128b of the latch 128 provides a visual indication that an unauthorized person has attempted to gain access to the line module 100. The latch 128 also has an upper portion 128c.

The upper portion 128c is relatively thin so as to fit comfortably beneath the notch 132. The shape of the upper portion 128c provides sufficient surface area to ensure adequate contact with notch 132. Further, the attachment point between the upper portion 128c and the locking slide 110 is such that the locking slide 110 will snap off if an unauthorized person attempts to gain access to the line module 100 by forcing open the cover 106. Damage to the locking slide 110 provides an additional visual indication that an unauthorized person has attempted to gain access to the line module 100.

Referring again to FIGS. 12-15, the stuffer box 108 of the stuffer assembly 109 is shown to the immediate left of the locking slide 110 and the movable latch 128. The stuffer assembly 109 is covered by the inner cover 54 when in the closed position. In operation, the stuffer box 108 must move from an extended, or disconnected, position to a retracted, or connected, position to engage the service provider wiring with the IDCs.

In the disconnected position, the stuffer box 108 must not interfere with the locking slide 110 or the perimeter wall 45 of the inner cover 54. As previously described, the securing screw 112 is used to move the stuffer box 108 between the disconnected and the connected positions. The perimeter wall 45 of the inner cover 54 rests slightly above the stuffer box 108. The stuffer box 108 may have an angled surface to permit a provider technician dispatched by the service provider to insert the service provider wiring into the wire insertion passages 111.

Referring now to FIGS. 3-4, a NID is shown and indicated generally at 10, and is constructed in accordance with another aspect of the invention. The NID 10 includes a base 12 that is generally rectangular in shape and a corresponding protective outer cover 14 movably attached to the base 12, thereby forming a closure. The base 12 of the NID 10 includes a back wall 21 (FIG. 5) and a perimeter wall 20 depending upwardly along the periphery of the back wall 21. Together, the back wall 21 and the perimeter wall 20 of the base 12 define an interior cavity 24 for receiving the terminating equipment and wiring connections housed within the NID 10.

The interior cavity 24 of the NID 10 is further defined by a provider 26 portion and a subscriber portion 28. The perimeter wall 20 preferably extends upwardly from the back wall 21 and has a corresponding recess 23 formed therein to form a plurality of entry ports 30 (FIG. 5-6). As shown in FIG. 7, the base 12 further includes one or more feet 41 for mounting the NID 10 in a known manner to a pole, wall or other building structure at the subscriber premises. Typically, the NID 10 is mounted outside the subscriber premises and the outer cover 14 locked on the base 12, as described herein, to prevent unauthorized access to the terminating equipment and the wiring connections housed within the NID 10.

The outer cover 14 is movable between a closed position, as shown in FIGS. 3-4, and an opened position. The outer cover 14 is preferably split into two distinct sections including a provider cover 200 and a subscriber cover 202. In preferred embodiments, the provider cover 200 and the subscriber cover 202 are movably connected to each other by hidden hinges (not shown) located along respective perimeter walls 208, 210.

Further, the provider cover 200 preferably has a front wall 204 that is at least partially overlapped by a front wall 206 of the subscriber cover 202 in the closed position. Also, in the closed position, the perimeter walls 208, 210 of the provider cover 200 and the subscriber cover 202 meet and form a closure with the perimeter wall 20 of the base 12 to prevent moisture and elements from entering. As stated herein above, the provider cover 200 and the subscriber cover 202 are preferably attached by hidden hinges, such that the subscriber cover 202 pivots about the provider cover 200 into an open position. However, it will be understood by those skilled in the art that any suitable attaching mechanism that allows pivotable movement may be employed. As best shown in FIG. 3, the front walls 204, 206, when in the closed position, have a generally tapered configuration.

However, as shown in FIG. 4, it will be understood by those skilled in the art that the front walls 204, 206, in the closed position, may form a smooth surface. In either case, the provider cover 200 may be movably attached to the base 12 in any suitable manner, but preferably is attached to the base 12 by a series of hinges 13 located along one side of the base 12 and the provider cover 200. Accordingly, the provider cover 200 pivots about the hinges 13 between the closed position and the opened position to provide access to the interior cavity 24 of the NID 10. The provider cover 200 is generally defined by the size of the provider portion 26 of the base 12 and is preferably configured to fit closely about the base 12.

The provider cover 200 acts to shield the provider portion 26 from unauthorized access, while permitting access to the subscriber portion 28.

As stated hereinabove, the subscriber cover 202 is movably attached to the provider cover 200 and is defined by the size of the subscriber portion 28 of the base 12. Preferably, the subscriber cover 202 is configured to fit closely about the subscriber portion 28 of the base 12. As with the provider cover 200, the subscriber cover 202 acts to shield the terminating equipment and wiring connections within the subscriber portion 28 from unauthorized access. The subscriber cover 202 may also be provided with a subscriber access means 46 having a locked and an unlocked position. Preferably, the subscriber access means 46 is locked in the closed position to the provider cover 200, thereby forming the closed outer cover 14.

More preferably, the subscriber access means 46 includes a locking screw (not shown) that requires an industry specific tool to remove it. The subscriber access means 46 permits the subscriber to gain access to the terminating equipment and wiring connections contained within the interior subscriber portion 28 of the NID 10 when necessary or desired by actuating the subscriber access means 46 to an unlocked position and manipulating the subscriber cover into the open position.

The NID 10 may also be provided with a provider override means 50 opposite the hinges 13 for securing the provider cover 200 to the base 12 in the closed position or opening the NID 10 in its entirety thereby exposing both the provider portion 26 and subscriber portion 28. Preferably, the provider override means 50 includes a locking screw (not shown) that requires an industry specific tool to remove it. The locking screw of the provider override means 50 is preferably configured to pass through the provider cover 200 to the base 12. Preferably, the provider override means 50 is operable for unlocking both the subscriber cover 202 and the provider cover 200. In the open position, the provider cover 200 and the subscriber cover 202 remain locked together by the subscriber access means 46. Accordingly, the provider override means 50 permits a field technician from the communications service provider to by-pass the subscriber access means 46 and thereby gain access to the terminating equipment and wire connections of the interior cavity 24 of the NID 10.

Specifically, by actuating the provider override means 50, a provider technician may manipulate the provider cover 200 and subscriber cover 202 to the open position, thereby gaining access to both the provider portion 26 and subscriber portion 28 of the NID 10 when it is necessary to service, repair, or reconfigure the NID 10. Unlike conventional NID designs, which require that the subscriber portion 28 be accessed independently from the provider portion 26, the use of the provider override means 50 provides a one step method of accessing the provider portion 26 and the subscriber portion 28 of the NID 10.

FIG. 16 illustrates a method 402 of bypassing a jack 404 in a Network Interface Device (NID) component such as a terminating device. The terminating device can be a Subscriber Line Module (SLM), a PTD, or the like, however for consistency and clarity, and not for reasons of limitation, the terminating device is hereinafter referred to as a SLM. During normal operations with a cover of the SLM closed, the jack 404 is not in electrical contact with a provider line 406, and provider line 406 is connected to a subscriber line 408, and shown in part 16a of FIG. 16. However, when the cover is in an open position, as better explained below, the jack 404 is connected to the provider line 406 and the provider line 406 is disconnected from the subscriber line 408 as shown in part 16b of FIG. 16.

Figure 17:
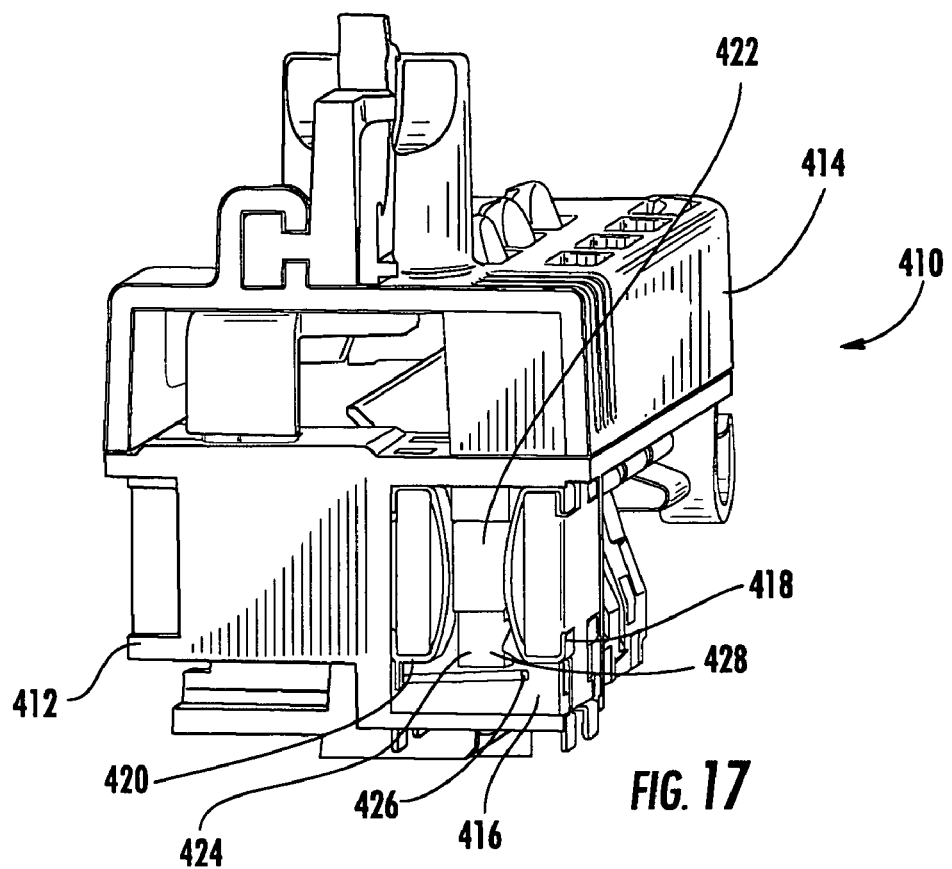
FIG. 17 illustrates a SLM including a base and a cover.

FIG. 17 illustrates a SLM 410 including a base 412 and a cover 414. The base 412 includes a cavity 416 in which are positioned a provider line contact 418 connected to the provider line 406 and a subscriber line contact 420 connected to the subscriber line 408. Contacts 418 and 420 are in one embodiment, opposed biased contacts in that they are biased toward each other and apply pressure against a bridging contact 422 placed on a contact support 424 extending from cover 414 when cover 414 is in a closed position as shown in FIG. 17. A wire 426 is biased toward provider line contact 418. Wire 426 extends to a jack 404 (not shown in FIG. 17).

When cover 414 is in the closed position as shown in FIG. 17, contact support 424 pushes wire 426 away from provider line contact 418 such that the jack is in a non-powered state. Contact support 424 is a non-conductive material and includes a non-conducting end 428. An environment sealant is typically used to protect the electrical components in cavity 416. For example, in one embodiment, a gel at least partially fills cavity 416.

Figure 18:
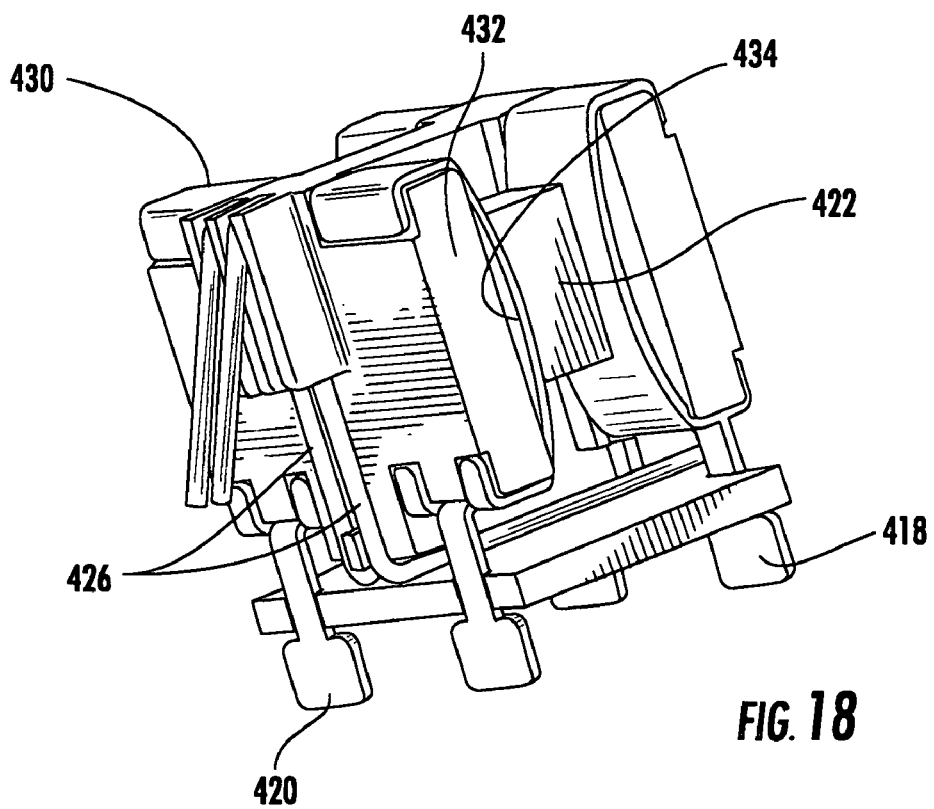
FIG. 18 illustrates that there are two wires extending to a jack position 430 wherein one wire is a ring wire and one wire is a tip wire.

FIG. 18 illustrates that there are two wires 426 extending to a jack position 430 wherein one wire 426 is a ring wire and one wire 426 is a tip wire. A holder assembly 432 holds contact 420 in place. Note that there is a gap 434 between contact 420 and holder assembly 432 which allows for compression of contact 420 when cover 414 is in the closed position. Contact 418 similarly compresses, and when cover 414 is opened both contacts 418 and 420 expand toward each other and thus form a pair of opposed biased contacts. In the embodiment shown in FIG. 18 the wires extend under the contacts to a side, and then upwards before turning downwards at an angle in jack 430.

Figure 19:
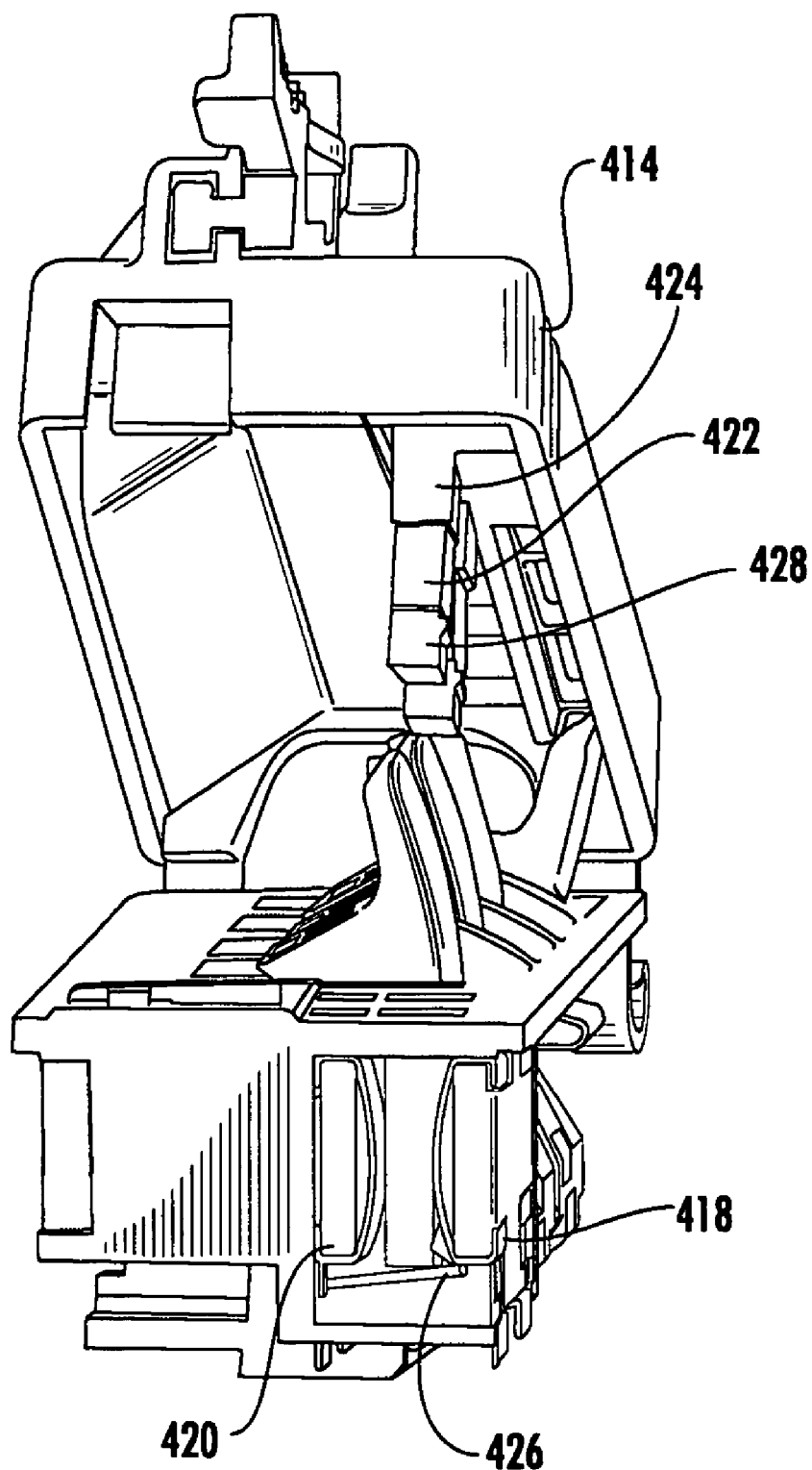
FIG. 19 illustrates a cover in an open position and illustrates the electrical connection between a wire and a contact.

FIG. 19 illustrates cover 414 in an open position and illustrates the electrical connection between wire 426 and contact 418. FIG. 19 also illustrates that there are actually two bridging contacts 422, one for the ring connection and one for the tip connection.

Figure 20:
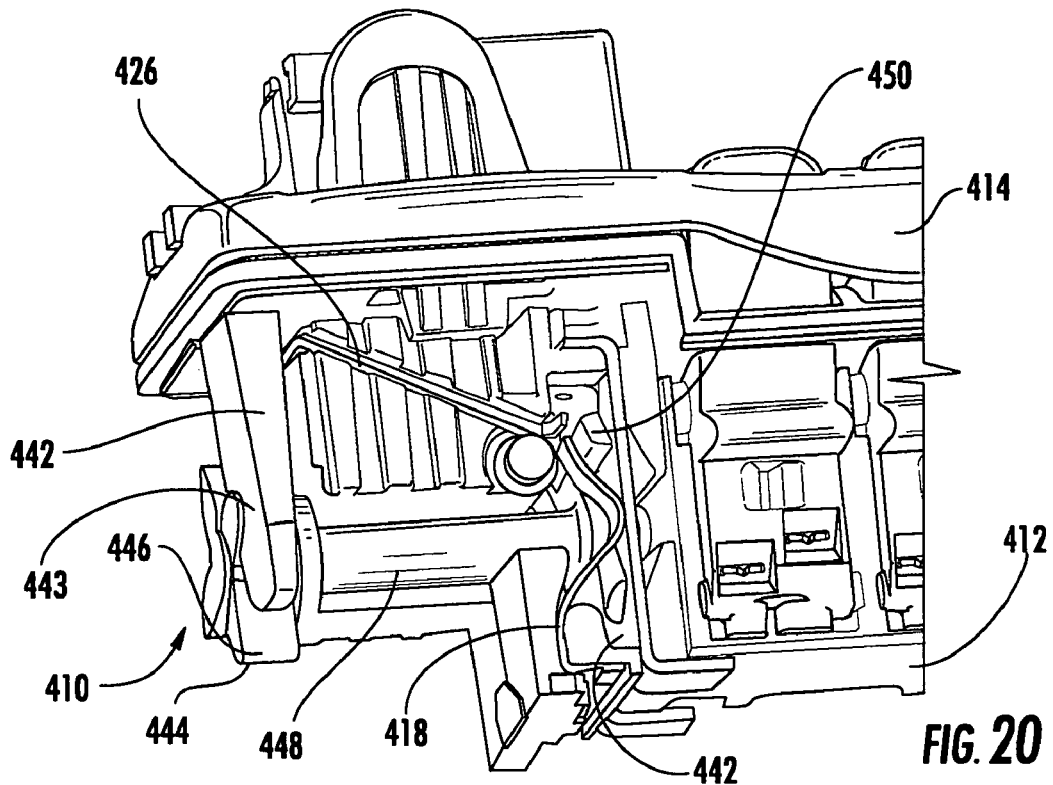
FIG. 20 illustrates another embodiment of a SLM wherein the electrical connections are similar to the SLM illustrated in FIGS. 102-104.
Figure 21:
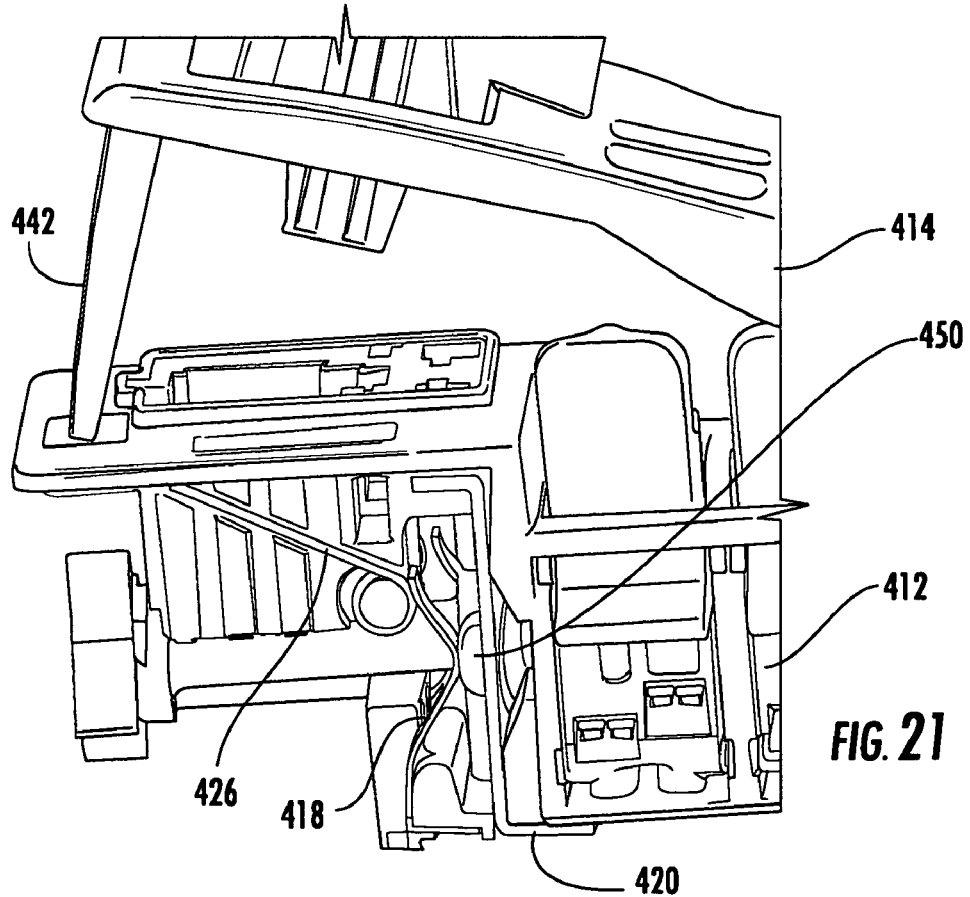
FIG. 21 illustrates another embodiment of a SLM wherein the electrical connections are similar to the SLM illustrated in FIGS. 102-104.

FIGS. 20 and 21 illustrate another embodiment of SLM 410 wherein the electrical connections are similar to the SLM 410 illustrated in FIGS. 17-19 in that the subscriber line contact 420 is electrically connected to the provider line contact 418 when the lid 414 is in the closed position (FIG. 20) and the contacts 418 and 420 are not electrically connected in the open position (FIG. 21). Additionally, also similar to the SLM 410 in FIGS. 17-19, the SLM 410 in FIGS. 20 and 21 electrically connects the jack wire 426 to the provider line contact 418 only in the open position. In the closed position, wire 426 is isolated from provider line contact 418. These connections and disconnections are accomplished with a rotating member 444 including a lobed end 446, a cylindrical middle portion 448, and a cammed end 450.

Similar to support 424, this embodiment includes an actuator 442 extending from cover 414. Actuator 442 includes an arcuate section 443 which engages lobed end 446 such that rotating member 444 is rotated upon closing and opening cover 414. Actuator 442 and support 424 both make and break electrical connections and are therefore also referred to herein as make and break members, or singularly, as a make and break member. As seen in FIG. 21, when the cover 414 was opened, cammed end 450 was rotated and pushed contact 418 away from contact 420 and breaking the electrical contact which was shown in FIG. 20.

Additionally, cammed end 450 is sized such that besides breaking the electrical connection between the contacts 418 and 420, contact 418 is biased against wire 426 thus energizing the jack. Although FIGS. 20 and 21 illustrate one side of the SLM 410, another set of contacts 418 and 420, and another wire 426 is on the back side of SLM 410 such that one side is for the ring connection and the other side is for the tip connection. When the open cover 414 in FIG. 21 is lowered and closed, as seen in FIG. 20, rotating member 444 is rotated and contact 418 moves away from wire 426 and contacts with contact 420.

Note that contact 418 is biased toward contact 420 and will touch contact 420 when cammed end 450 is in the position shown in FIG. 20. Also note that contacts 418 and 420 are positioned in an internal closed chamber 452 (FIGS. 20 and 21 do not show sidewalls as shown below, but the SLM 410 in FIGS. 20 and 21 do include sidewalls), and an environment sealant is typically used to protect the electrical components in cavity 452. For example, in one embodiment, a gel at least partially fills cavity 452. The cavity 416 in the earlier embodiment is opened to the environment when cover 414 is in the opened positioned, but the chamber 452 is never opened to the environment.

Figure 22:
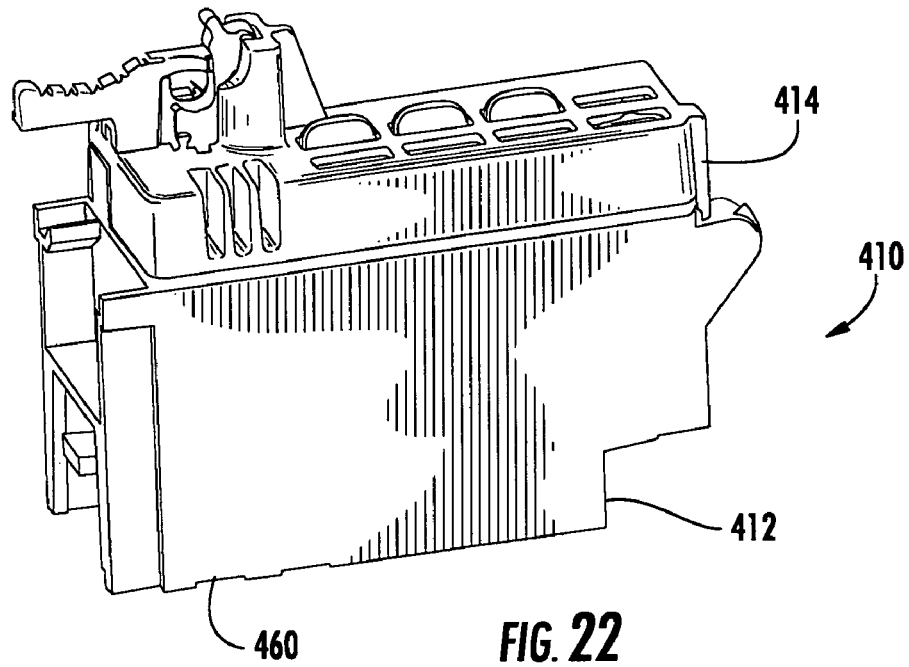
FIG. 22 illustrates the SLM with sidewalls.

FIG. 22 illustrates the SLM 410 with sidewalls 460 thus closing chambers 452 in FIGS. 20 and 21.

Figure 23:
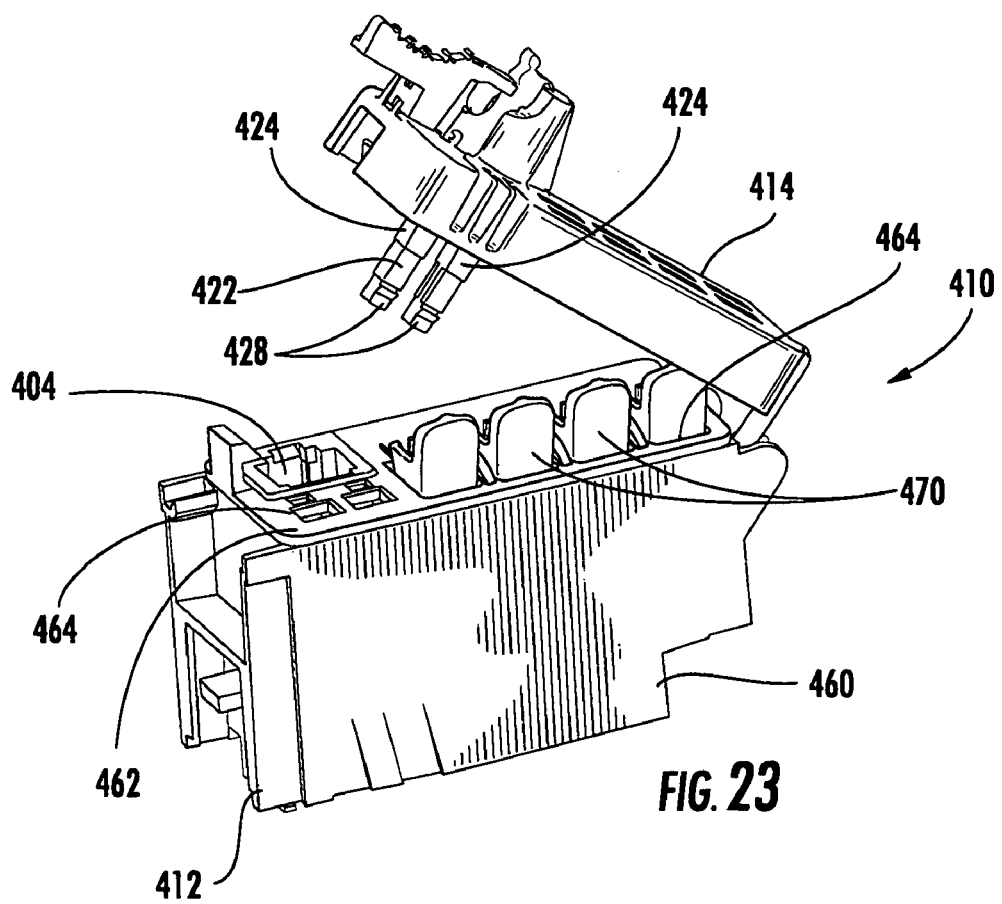
FIG. 23 illustrates the SLM in an open position wherein a top plate is positioned on top of the sidewalls.

FIG. 23 illustrates the SLM 410 in an open position wherein a top plate 462 is positioned on top of sidewalls 460. Openings 464 for contact supports 424 to pass through are provided on top plate 462. FIG. 23 also shows jack 404 in base 412. Top plate 462 also has a plurality of openings 464 for a plurality of actuating arms 470 to pass through. Cover 414 is pivotably mounted to base 412.

Figure 24:
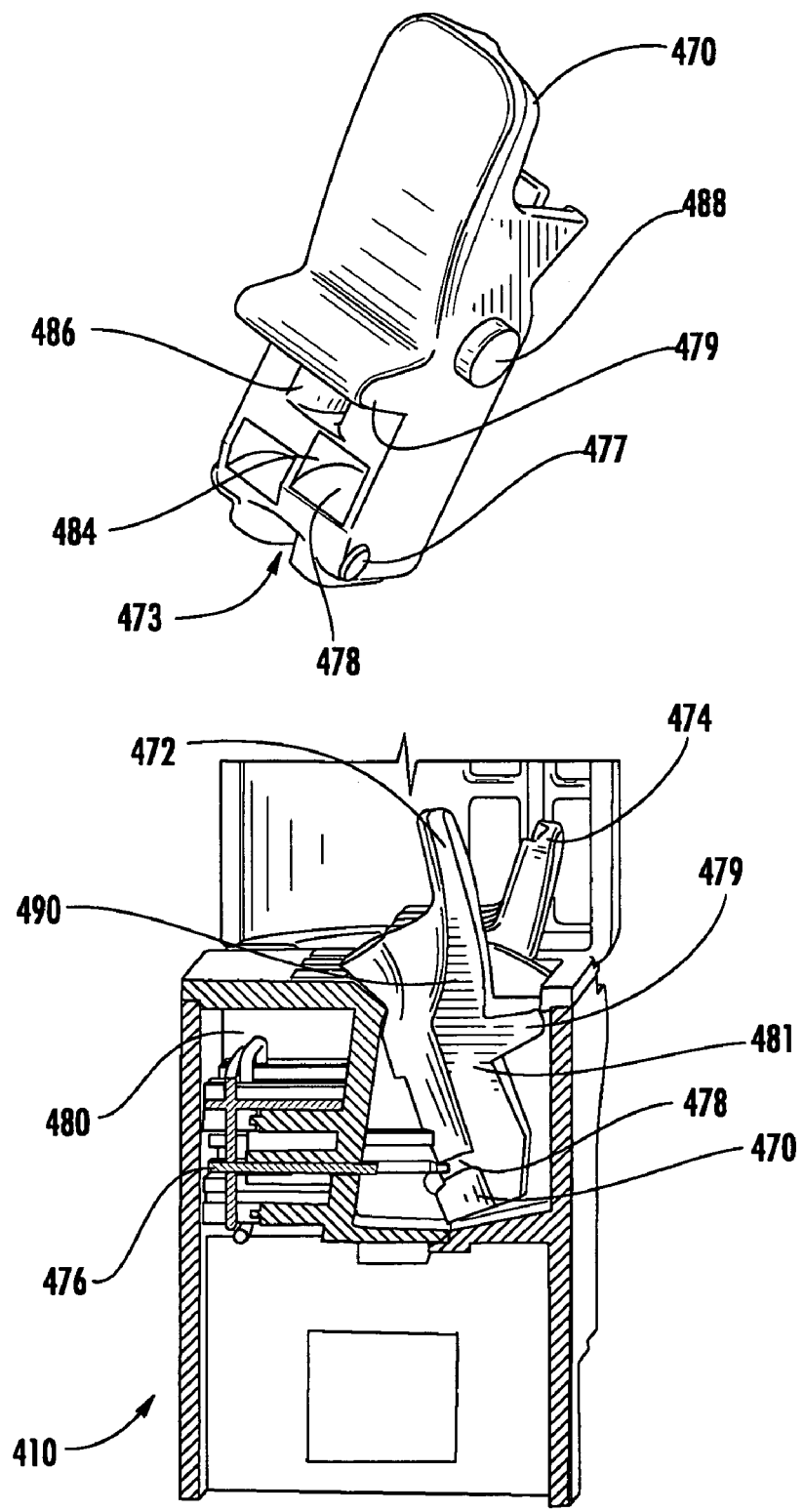
FIG. 24 illustrates the SLM with a plurality of actuating arms including one arm in a disconnected position and one arm in a connected position.

FIG. 24 illustrates SLM 410 with a plurality of actuating arms 470 including one arm in a disconnected position 472 and one arm in a connected position 474. An insulation displacement connector (IDC) 476 extends from a service provider portion 480 to a subscriber portion 482 of SLM 410. Each actuating arm 470 includes an opening 478 to receive an IDC 476. In one embodiment, the opening includes an angled and curved portion 484. The portion 484 being angled and curved serves to make the opening 478 smaller than it would be with a non-angled and non-curved portion.

This size reducing feature aids in the IDC 476 entering opening 478 and displacing insulation on a subscriber wire by limiting the amount of flex or travel the IDC 476 has in opening 478. Actuating arm 470 can also have a pivot journal 488 that mates with a bearing surface on the SLM 410. Journal 488 allows for actuating arm 470 to be pivoted between the disconnected position 472 and the connected position 474. Actuating arm 470 can also have a channel 473 and a hole 486 which both allow for gel to flow through arm 470 to facilitate an easy positioning of arm 470 in the disconnected position 472 and the connected position 474. A detent 477 is positioned on arm 470 such that the detent 477 will click into a corresponding structure on the SLM 410 to inform a user that arm 470 is in the connected position 474.

Additionally, detent 477 helps maintain arm 470 in the connected position. Also, in one embodiment, arm 470 includes a gel retention extension 479 extending from a medial section 481 of arm 470. Gel retention extension 479 serves to block gel below extension 479 from moving above extension 479. Extension 479 also serves to act as a positive stop to stop the pivotal motion when extension 479 contacts top plate 462. Extension 479 is also useful for blocking the gel from being seen by a user and helps to protect the gel from the environment.

Figure 25:
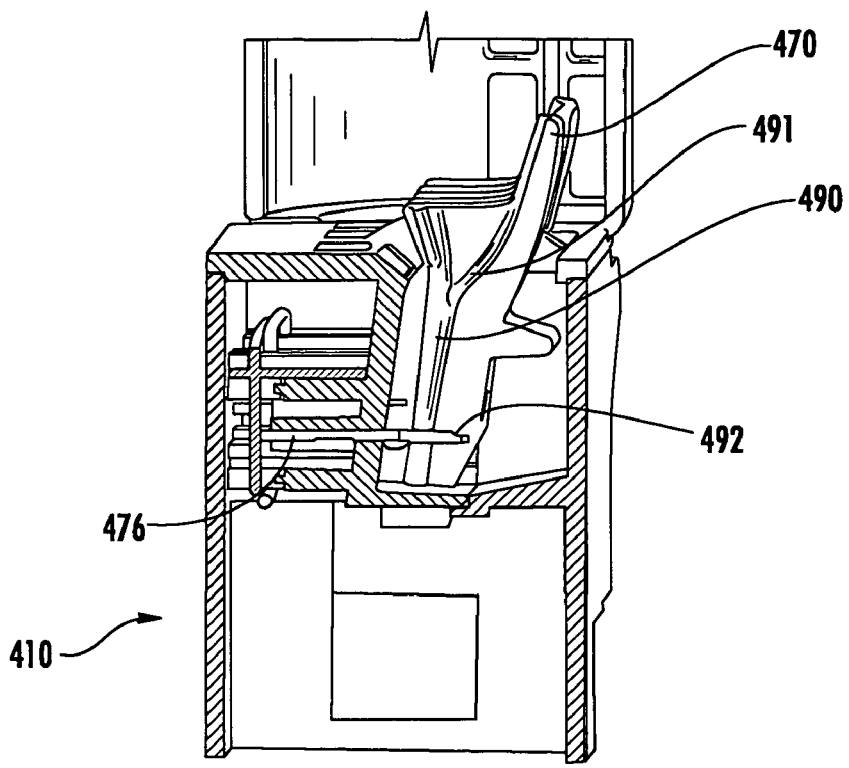
FIG. 25 illustrates the SLM with an arm in the connected position.

FIG. 25 illustrates SLM 410 with arm 470 in the connected position. Note how the IDC 476 extends into an IDC channel 492 on arm 470. Also on arm 470 is a subscriber channel 490 for receiving a subscriber wire. Note in FIG. 25 channel 490 is angled obtusely with respect to IDC 476, while in FIG. 24 channel 490 is angled acutely with respect to IDC 476. Also channel 490 includes a conical shaped wire guiding section 491 which aids a user in inserting a wire in channel 490. In use, a user inserts the subscriber wire (typically with insulation) into channel 490 and rotates arm 470 to the connected position and IDC 476 displaces the insulation on the subscriber wire and makes electrical contact with the subscriber wire.

Put another way, a user inserts the subscriber wire into the one piece unitary arm 470 and the arm is rotated from an acute relationship with the IDC 476 to an oblique relationship such that the subscriber wire engages the IDC 476 in a rotating motion. Heretofore, the subscriber wire engaged an IDC using linear motion. Additionally, because the arms 470 pivot and receive the IDC in the connected position, arms 470 are also herein referred to a pivoting insulation displacement connector holders. Also note in FIG. 25 there is an empty space below arm 470 in which electronics such as a printed circuit board (PCB) can be placed. The PCB can be a half ringer, an ADSL board, or a VDSL board, or the like.

Figure 26:
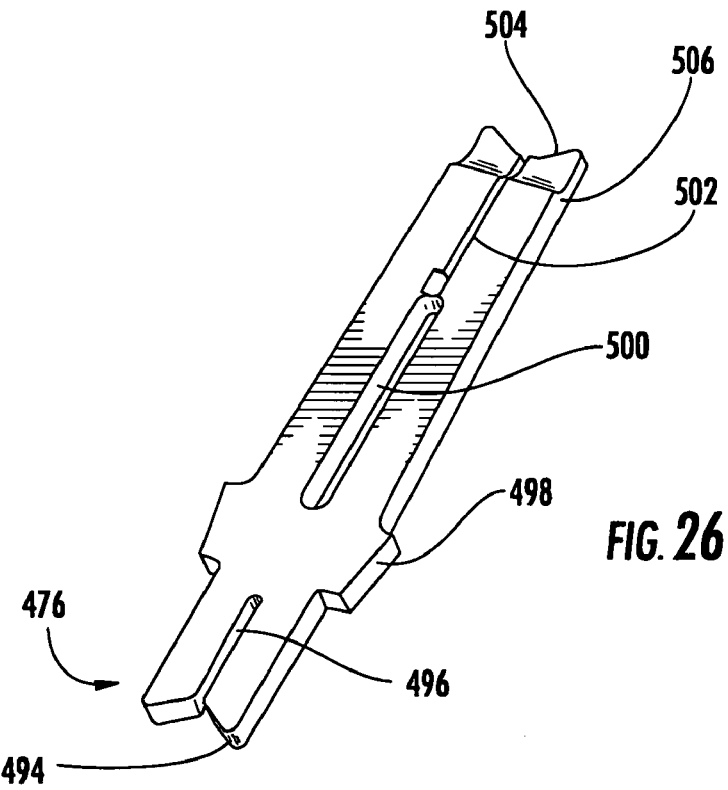
FIG. 26 illustrates one embodiment of an IDC having a tapered generally v shaped provider end and a provider wire slot extending therefrom.

FIG. 26 illustrates one embodiment of IDC 476 having tapered generally v shaped provider end 494 and a slot 496 extending therefrom. IDC 476 also has a widened shoulder region 498. Shoulder region 498 is typically where IDC 476 is attached to SLM 410. A channel 500 extends from shoulder region toward a subscriber wire portion 502 of IDC 476. The subscriber wire portion 502 extends to a generally v shaped subscriber end 504. A ramp 506 is positioned between the subscriber wire portion 502 and the subscriber end 504 such that the subscriber end 504 is less thick than the rest of the IDC 476. This decrease in thickness is because the subscriber wire is typically a smaller wire in diameter then the provider wire. For example, subscriber end 504 typically receives 24-18 gage wire, and provider end 494 typically receives 20-24 gage wire.

Figure 27:
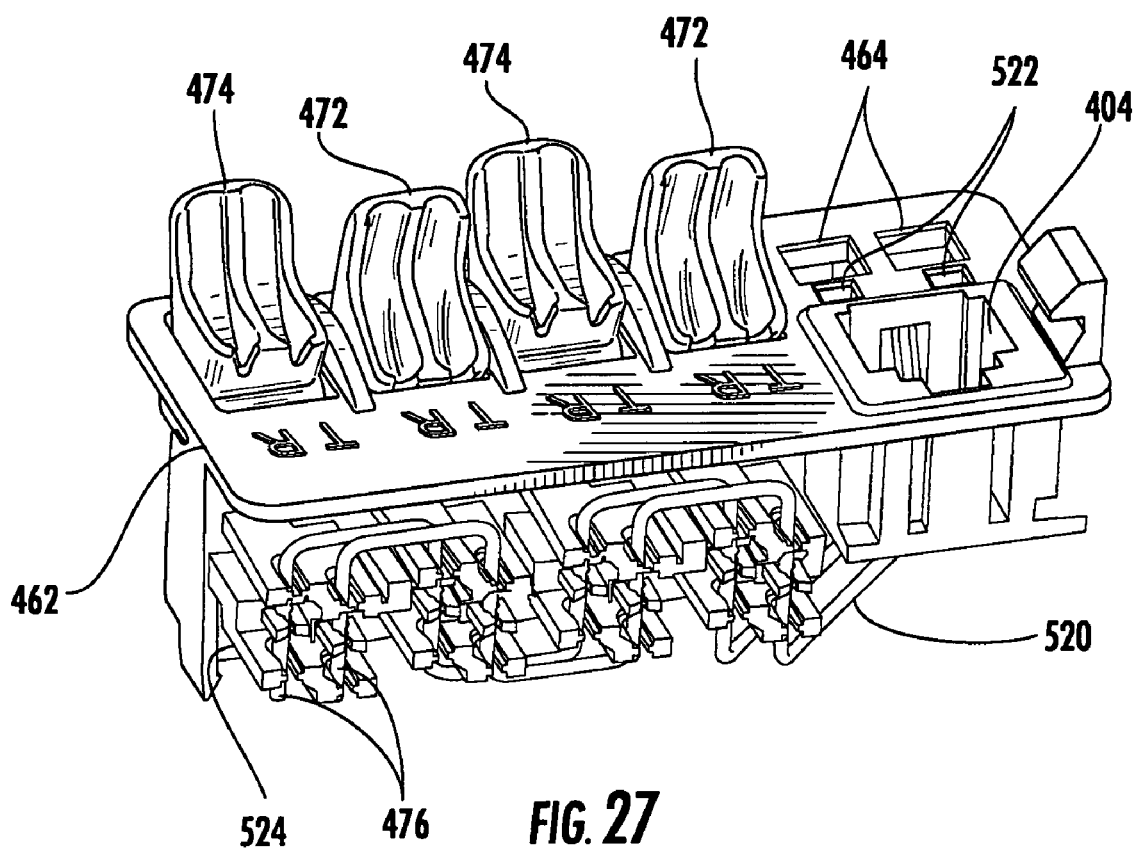
FIG. 27 illustrates the SLM wherein some arms are in the connected position and some arms are in the unconnected position.

FIG. 27 illustrates the SLM 410 wherein some arms 470 are in the connected position 474 and some arms 470 are in the unconnected position 472. FIG. 27 illustrates the routing of two provider wires 520 from different elevations of the IDCs 476 to jack 404. A chamber 524 where wires 520 are connected to the IDCs 476 is typically filled with a potting material to protect wires 520. In other words, IDCs 476 are positioned in SLM 410 in a factory, provider wires 520 are placed in the provider ends 494 of the IDCs 476, and then the potting material is applied in chamber 524.

Chamber 524 is also referred to herein as a provider wire routing area. The subscriber wire ends 502 of IDCs 476 are covered with a gel in the factory and, later in the field, the subscriber wires are connected to the IDCs 476. SLM 410 also includes, in one embodiment, a plurality of test probe openings 522 on top plate 462.

Figure 28:
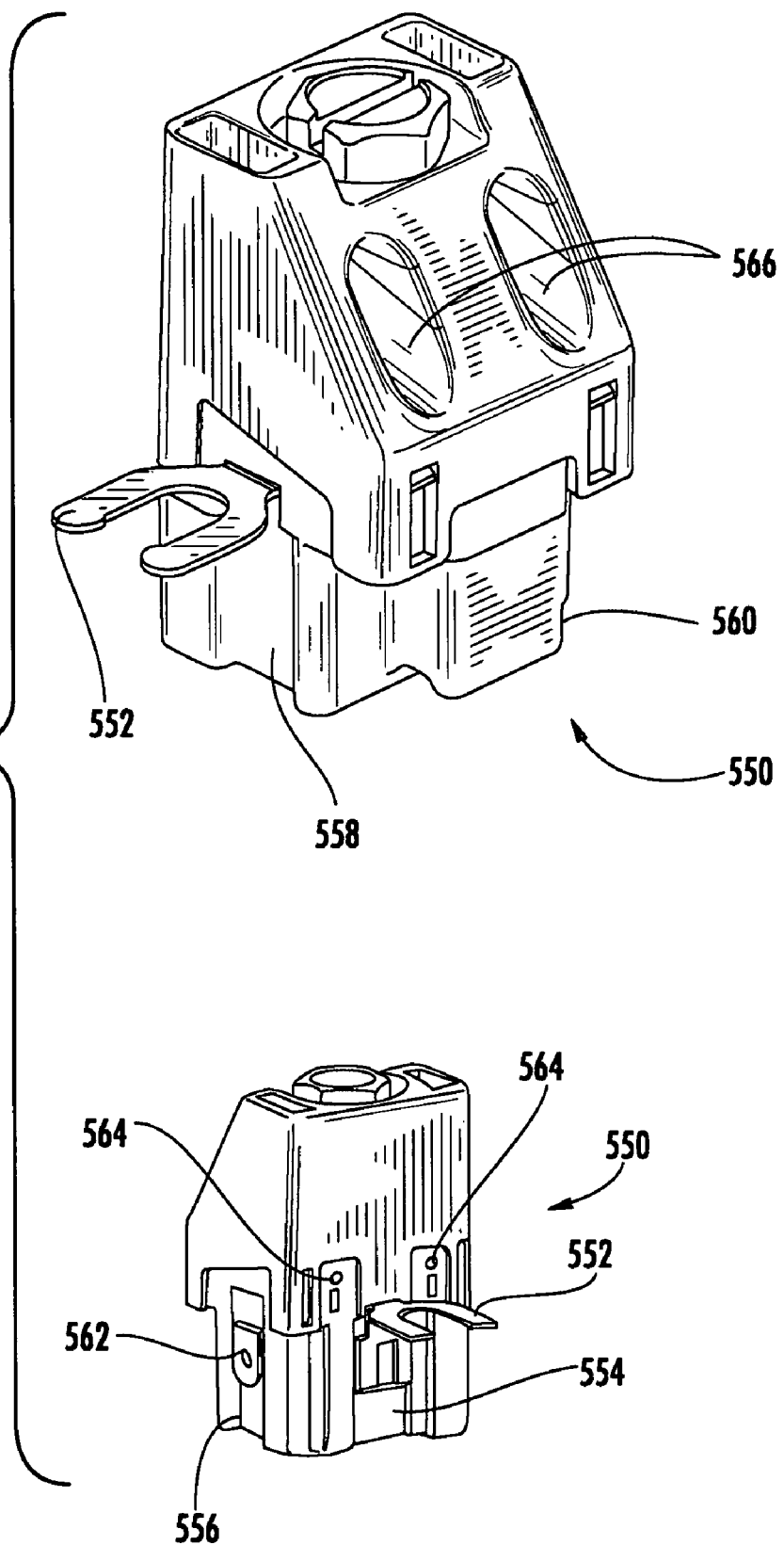
FIG. 28 illustrates a protector module with a ground adapter removably attached to a back side of the module.

FIG. 28 illustrates a protector module 550 with a ground adapter 552 removably attached to a back side 554 of the module 550. Module 550 also has a first side 556 where adapter 552 can also be mounted. Alternatively adapter 552 can be mounted to a second side 558 or a front side 560 of module. Ground adapter 552 typically slides onto a mounting tab 562. Back side 554 of module 550 includes two openings 564 to receive two subscriber wires, and front side 560 includes two openings 566 to receive two provider wires.

Figure 29:
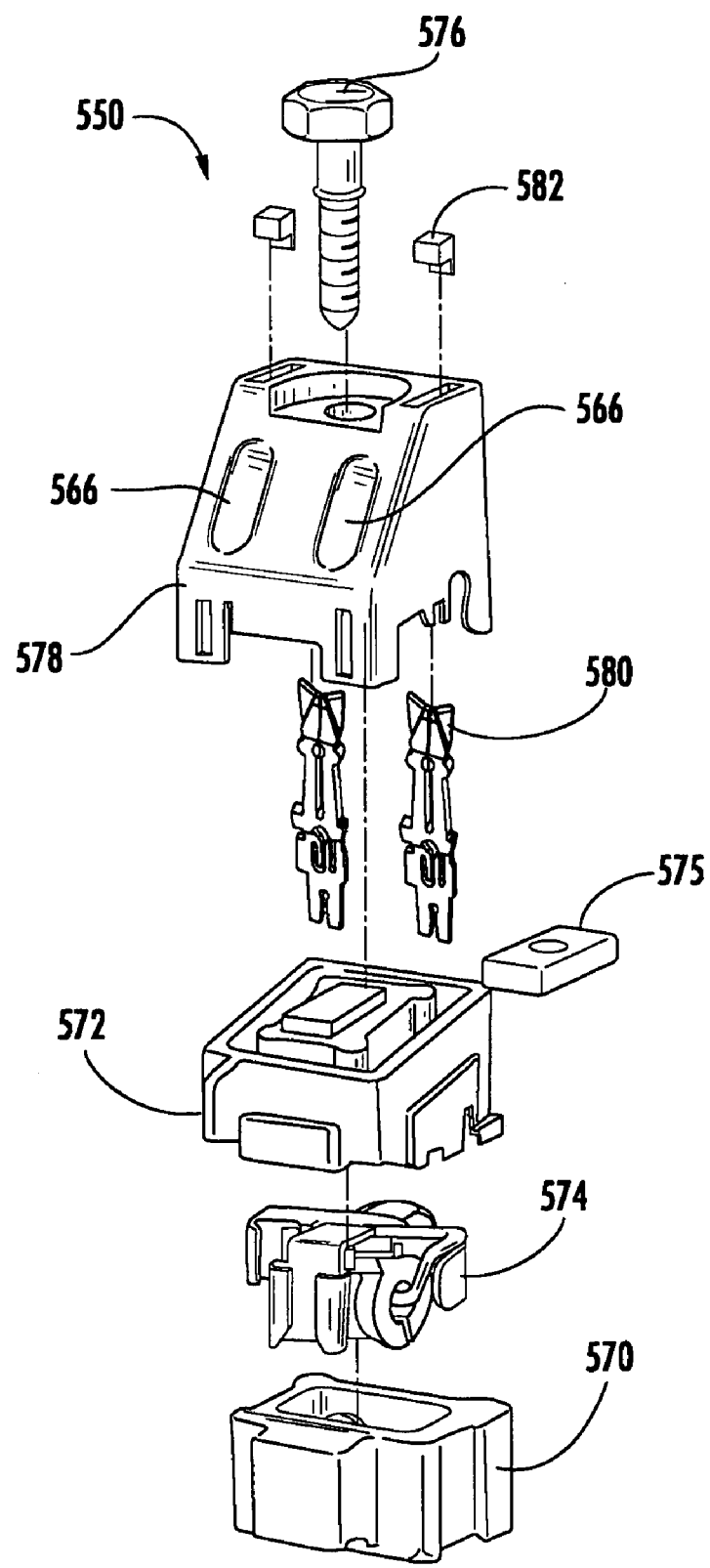
FIG. 29 illustrates an exploded view of module including a base portion and a middle base portion.

FIG. 29 illustrates an exploded view of module 550 including a base portion 570 and a middle base portion 572 which is typically ultrasonically welded to base 570 forming an interior chamber which holds a ground and gas tube assembly 574. A nut 575 is positioned on top of middle base 572 and a screw 576 is used to position a stuffer 578 on middle base 572. Of course, other fasteners besides screws and nuts may be used. Within stuffer 578 are positioned two IDCs 580 which extend to ground and gas tube assembly 574. Two test contacts 582 are positioned on top of stuffer 578 and are connected to the IDCs 580. Screw 576 is used to move stuffer 578 towards and away from middle base 572. IDCs 580 allow for the electrical connections between different wires, leads, etc. and thus fall into the category of being a connector member wherein the term connection member includes non insulation displacement connectors.

Figure 30:
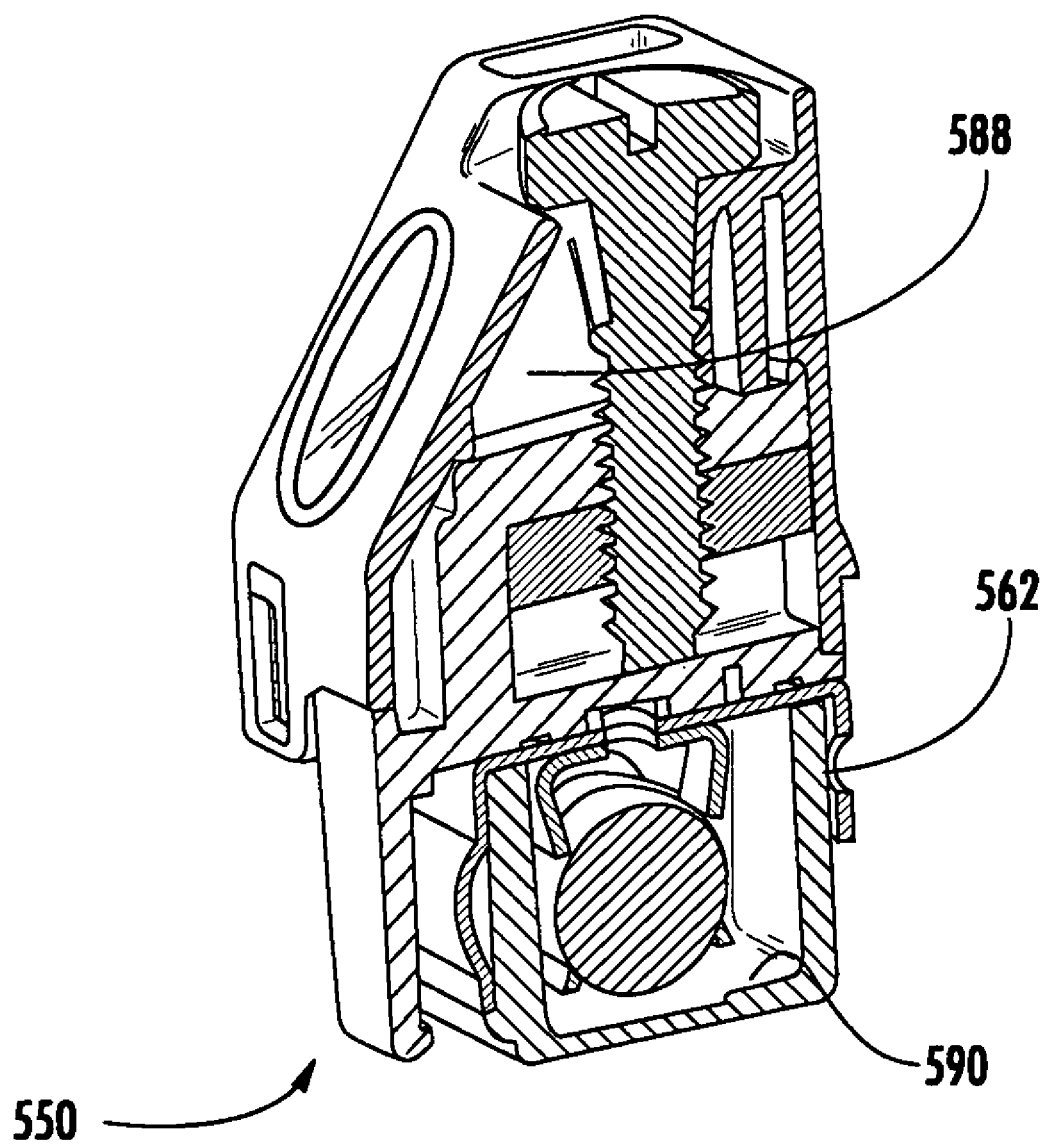
FIG. 30 illustrates a cut away view of the module wherein a chamber which houses most of the IDCs is typically filled with gel.

FIG. 30 illustrates a cut away view of module 550 wherein a chamber 588 which houses most of the IDCs 580 is typically filled with gel. FIG. 30 also shows an interior chamber 590 which holds a ground and gas tube assembly 574. Because base 570 and middle base 572 are ultrasonically welded together, chamber 590 is sealed from the environment, and gel is typically not present in chamber 590.

Figure 31:
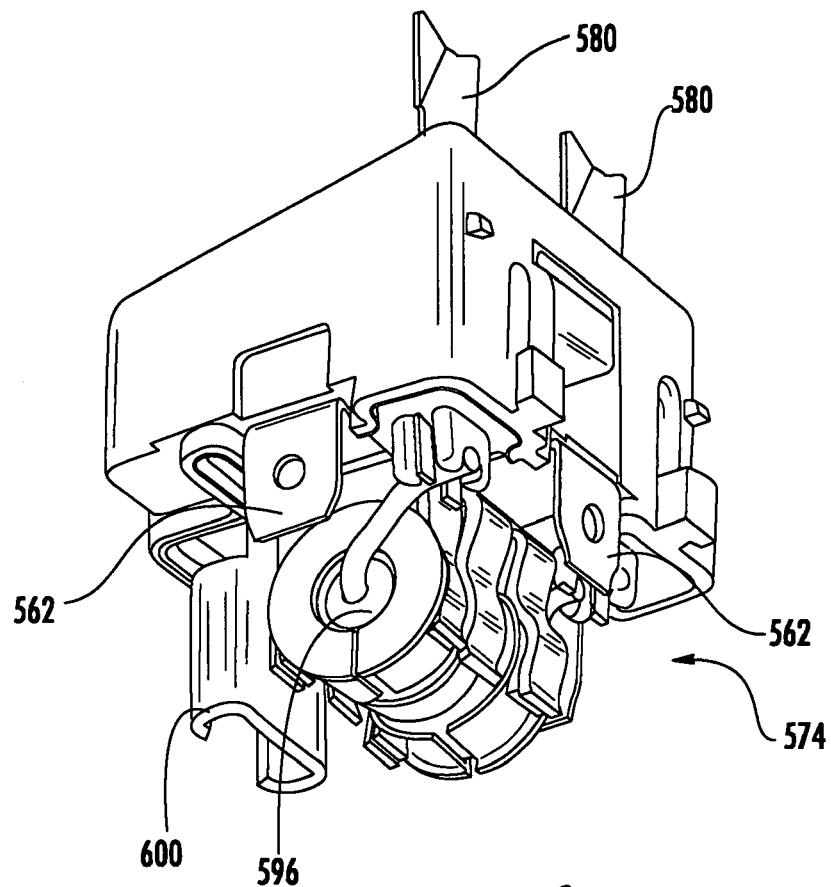
FIG. 31 illustrates the connection between a ground and gas tube assembly and the IDCs.
Figure 32:
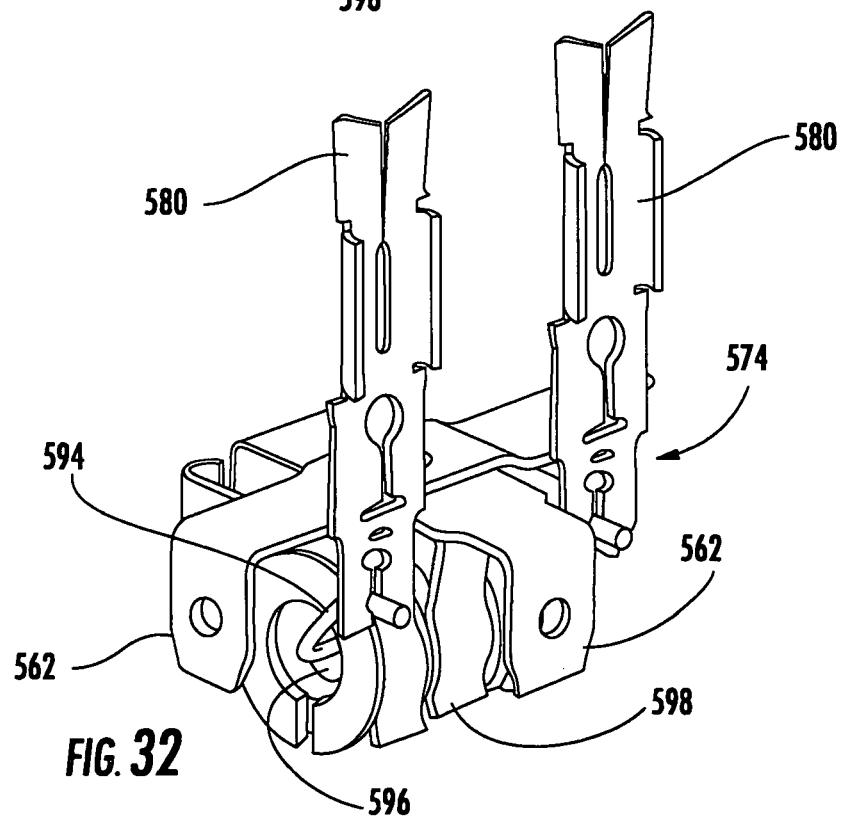
FIG. 32 illustrates the connection between a ground and gas tube assembly and the IDCs.

FIGS. 31 and 32 illustrate the connection between ground and gas tube assembly 574 and the IDCs 580. A gas tube lead 594 extends from a gas tube 596 and into the IDC 580. As seen best in FIG. 32 the ground and gas tube assembly 574 includes a plurality of ground mounting tabs 562 allowing a user to select which side to place a ground adapted 552. Accordingly, module 550 is versatile and can be used in many different configurations with other electronic devices. For use with a Protector Termination Device (PTD), module includes a PTD footprint ground sleeve 600, in one embodiment. Also, a gas tube assembly arm 598 can be riveted to the mounting tabs 562 for ruggedness in the field.

Figure 33:
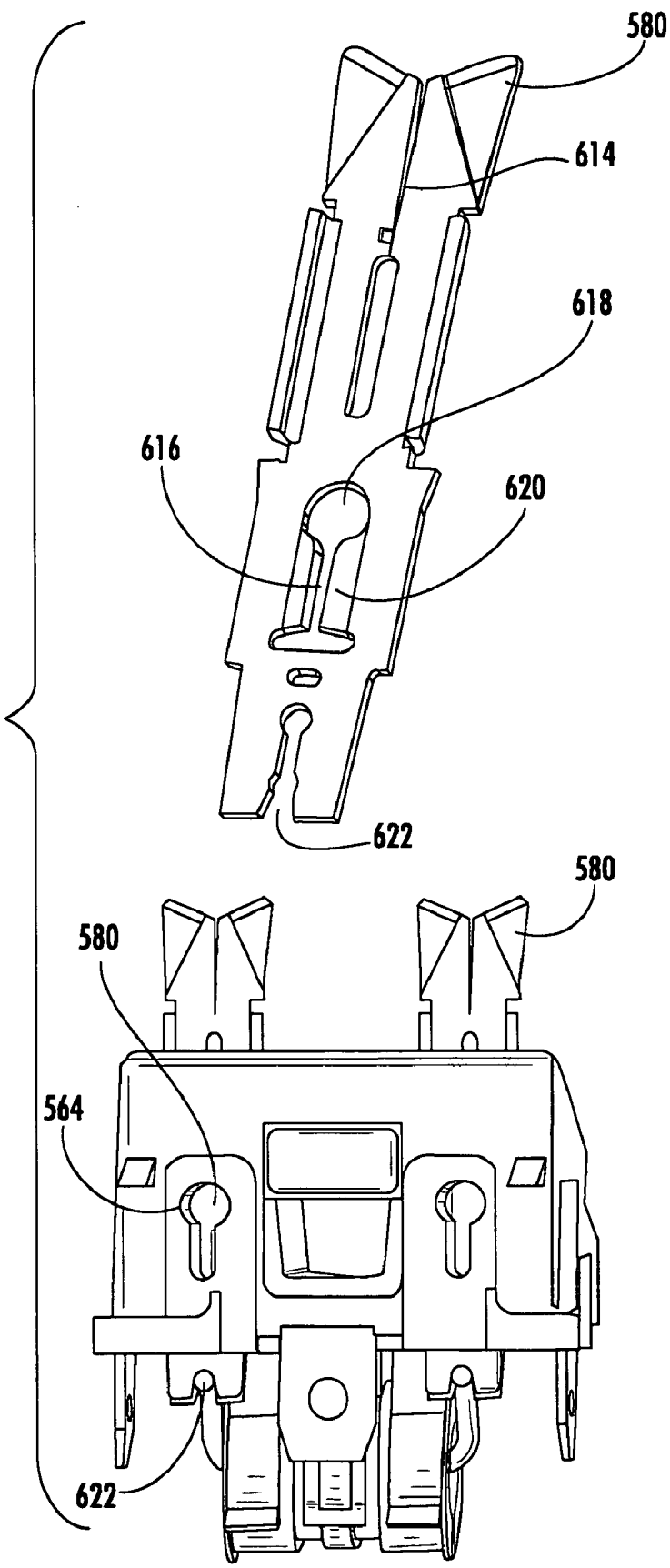
FIG. 33 illustrates openings that have a generally circular top portion and a slotted bottom portion.

FIG. 33 illustrates the openings 564 have a generally circular top portion 610 and a slotted bottom portion 612. FIG. 33 also illustrates the IDC 580 has a provider wire receiving section 614, a subscriber wire receiving section 616 and a gas tube lead (or wire) receiving section 622. Subscriber wire receiving section 616 is shaped similar to openings 564 in that section 616 also includes a generally circular shaped top section 618 and a slotted bottom section 620.

Figure 34:
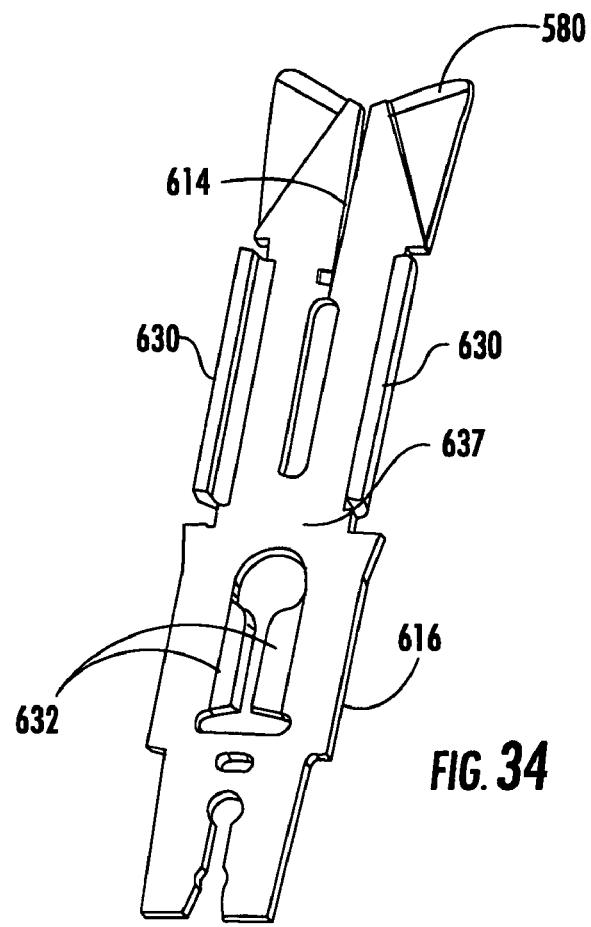
FIG. 34 illustrates two strengthening features on the IDC to add strength to provider portion.

FIG. 34 illustrates two strengthening features 630 on IDC 580 to add strength to provider portion 614. Features 630 extend outward away from edges of IDC 580 and proceed to turn and then extend perpendicular to a main body 631 of IDC 580. Also shown in FIG. 34 are two bending tabs 632 which provide for easy control and insertion when inserting a subscriber wire in subscriber section 616. The bending tabs 632 also provide for good holding of the inserted wire.

Figure 35:
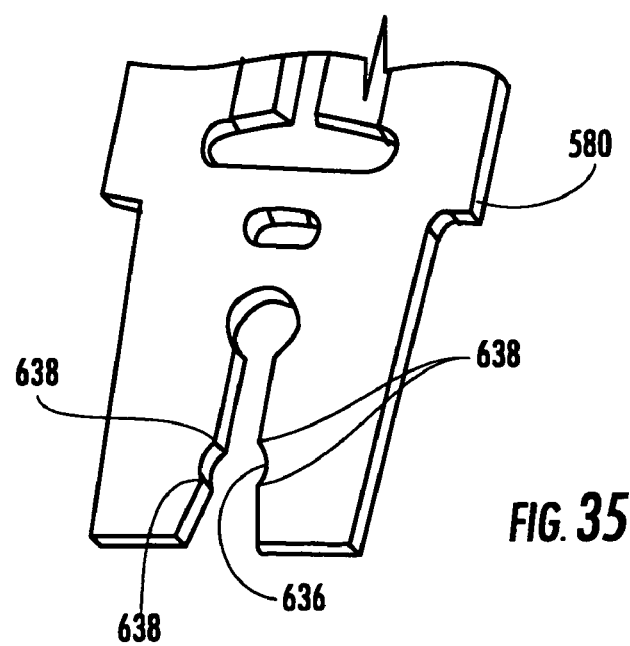
FIG. 35 illustrates a gas tube lead contact area on the IDC such that contact is made between the IDC and the gas tube lead at four points.

FIG. 35 illustrates a gas tube lead contact area 636 on IDC 580 such that contact is made between IDC 580 and the gas tube lead at four points 638. Note that IDC 580 provides for three distinct IDC connections in a linear fashion. In other words, the subscriber line, the provider line, and the gas tube line are all in a straight line enabling a smaller size device (e.g., the PLM 700 described below) than heretofore. Typically subscriber section 616 receives 24-18 gage wire, and provider section 614 typically receives 20-24 gage wire. Therefore, it is advantageous to strengthen or stiffen provider section 614.

Figure 36:
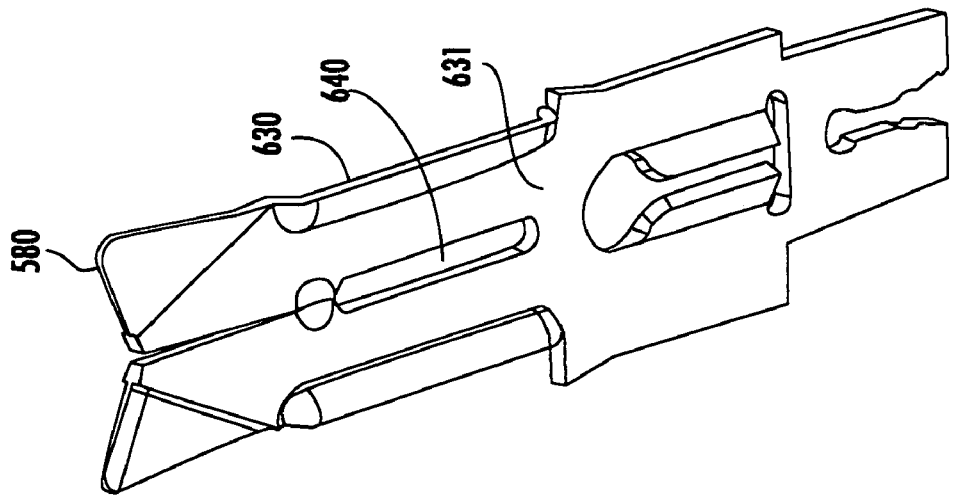
FIG. 36 illustrates the IDC with strength features that extend from a body toward the edges of the body.

FIG. 36 illustrates the IDC 580 with strength features 630 that extend from body 631 toward the edges of body 631. In one embodiment, strength features 630 are stamped portions of IDC 580 which are then bent to break the plane of IDC 580 and add rigidity to the provider portion 616 of IDC 580.

Figure 37:
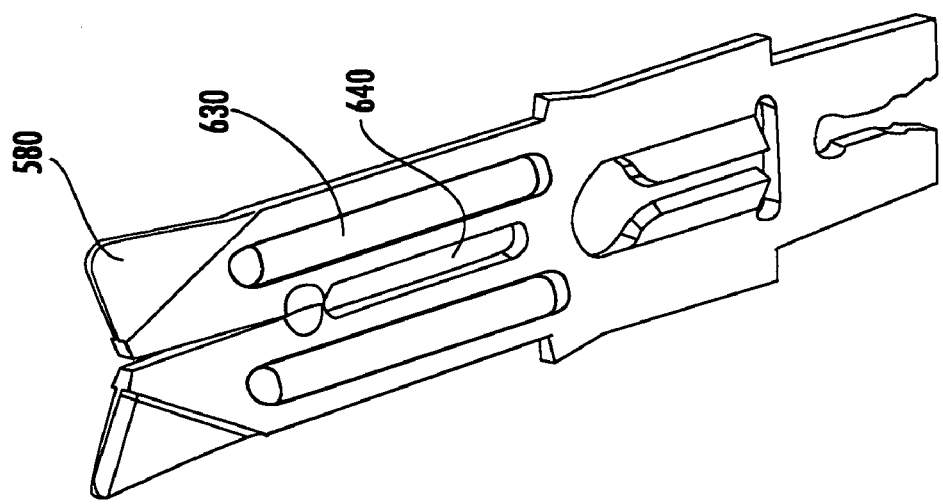
FIG. 37 illustrates the IDC with strength features that extend from the body between a centrally disposed slot and the edges.

FIG. 37 illustrates the IDC 580 with strength features 630 that extend from body 631 between a centrally disposed slot 639 and the edges.

Figure 38:
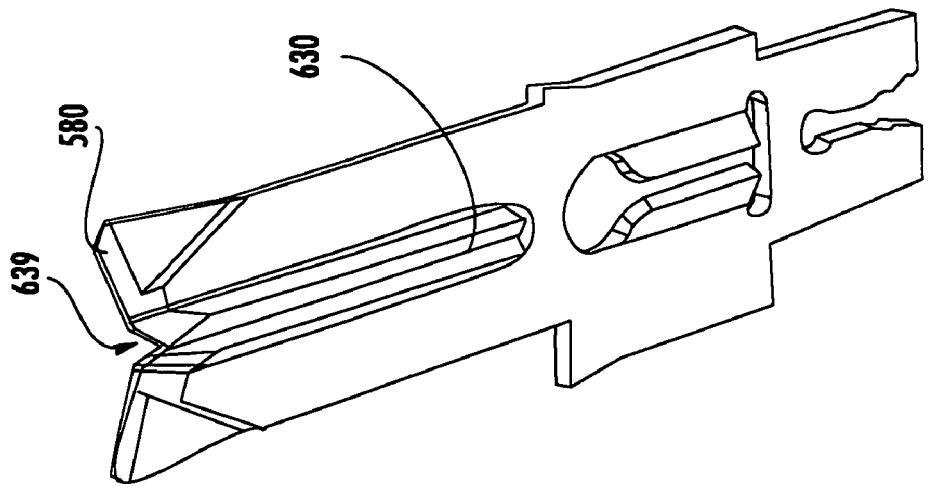
FIG. 38 illustrates the IDC with strength features in the centrally disposed slot.

FIG. 38 illustrates the IDC 580 with strength features 630 in the centrally disposed slot 640.

Figure 39:
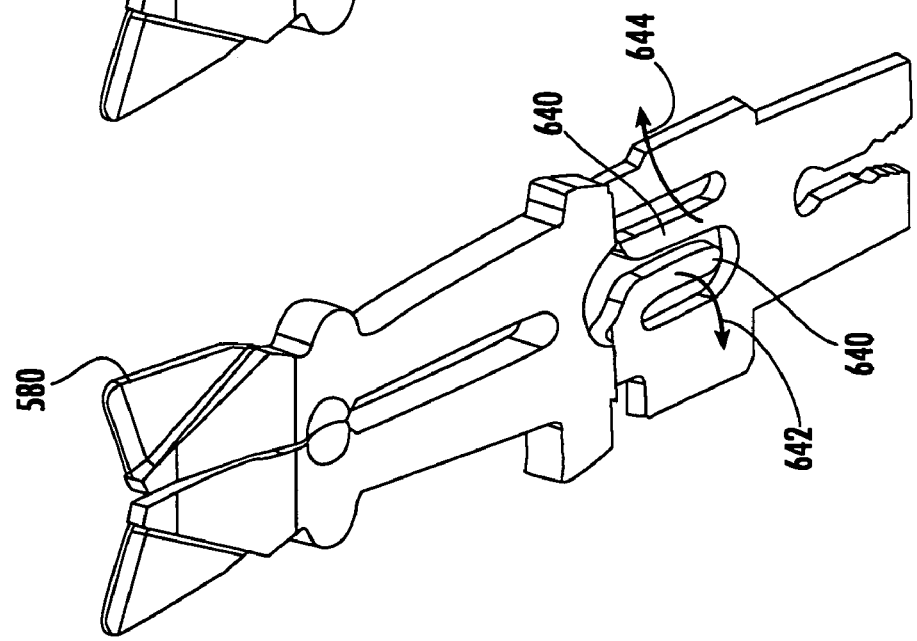
FIG. 39 illustrates the IDC wherein the subscriber wire portion includes a pair of oppositely extending members.

FIG. 39 illustrates IDC 580 wherein the subscriber wire portion 616 includes a pair of oppositely extending members 640. When a subscriber wire in inserted in portion 616 one member 640 deflects in the direction of arrow 642 while the other member 640 deflects in the direction of arrow 644.

Figure 40:
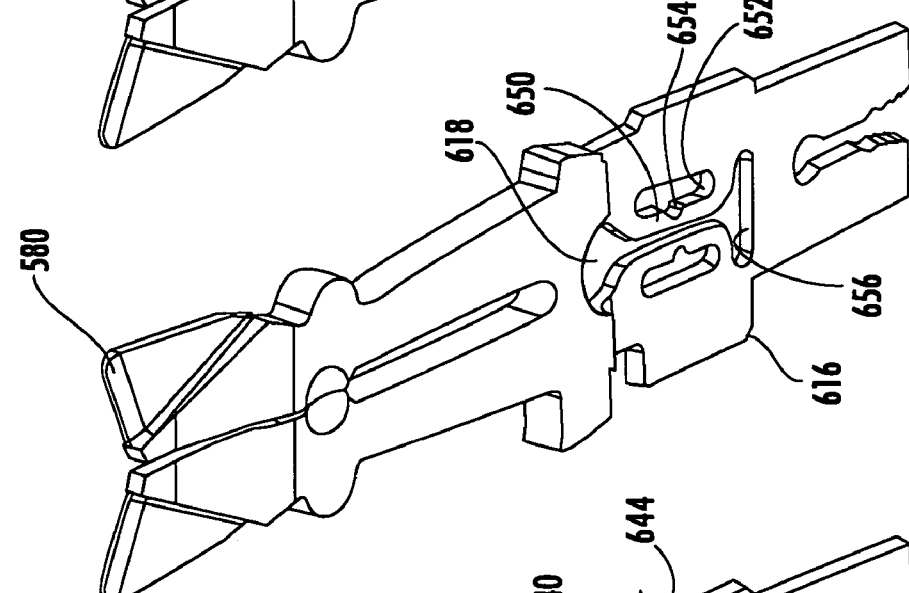
FIG. 40 illustrates the IDC wherein the subscriber wire portion includes a pair of opposed contact members having a longitudinally extending slot with an inner facing depression.

FIG. 40 illustrates IDC 580 wherein the subscriber wire portion 616 includes a pair of opposed contact members 650 having a longitudinally extending slot 652 with an inner facing depression 654. A slot 656 is also positioned in portion 616 on a side of members 650 opposite the generally circular opening 618.

Figure 41:
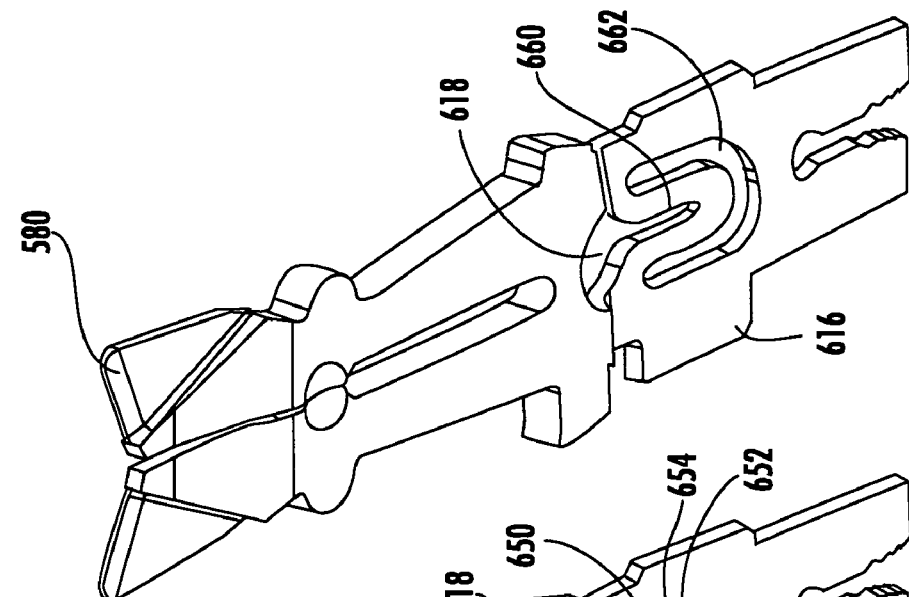
FIG. 41 illustrates the IDC wherein a slot extends to the generally circular opening, and a u shaped channel is placed around the slot.

FIG. 41 illustrates IDC 580 wherein a slot 660 extends to the generally circular opening 618, and a u shaped channel 662 is placed around the slot 660.

Figure 42:
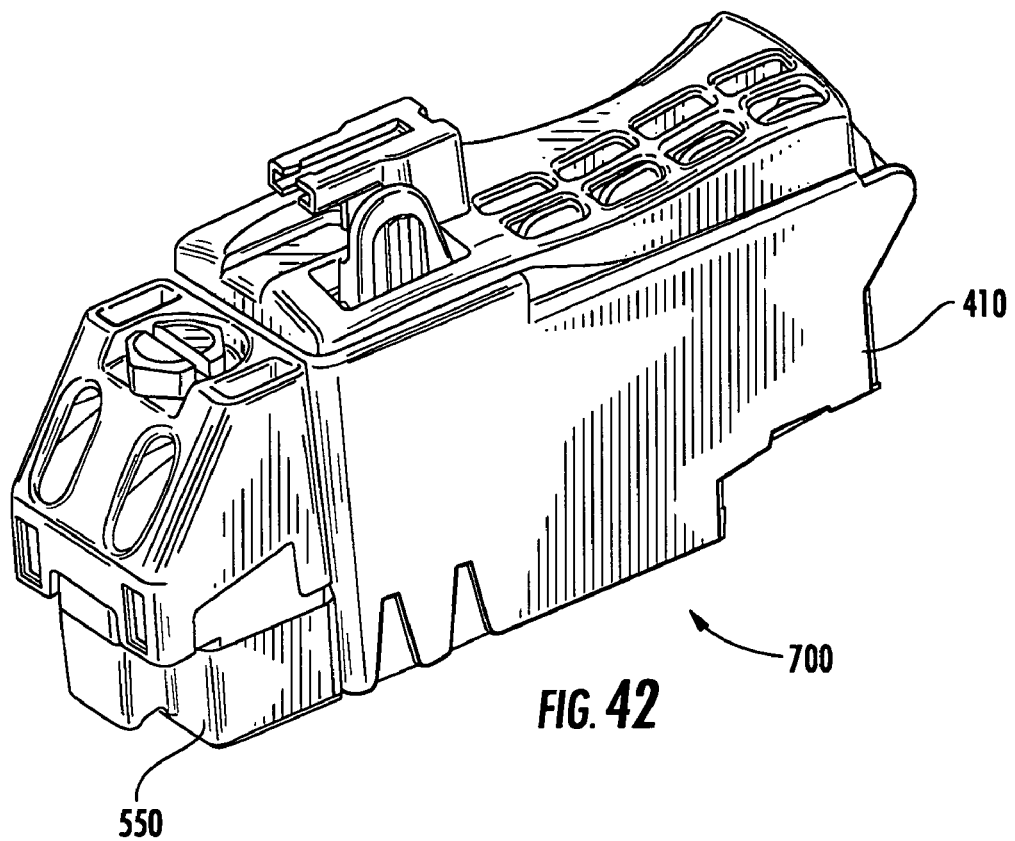
FIG. 42 illustrates the SLM in combination with the module forming a protected line module (PLM) that fits the herein described NID.

FIG. 42 illustrates SLM 410 in combination with module 550 forming a protected line module 700 (PLM) that fits the herein described 3-line NID 10. Note that in FIG. 5 line module 100 is the same as SLM 410. However, FIG. 5 also shows a SLM below line module 100, and the SLM is connected to a separate protector module to the left of the SLM and line module 100.

Figure 43:
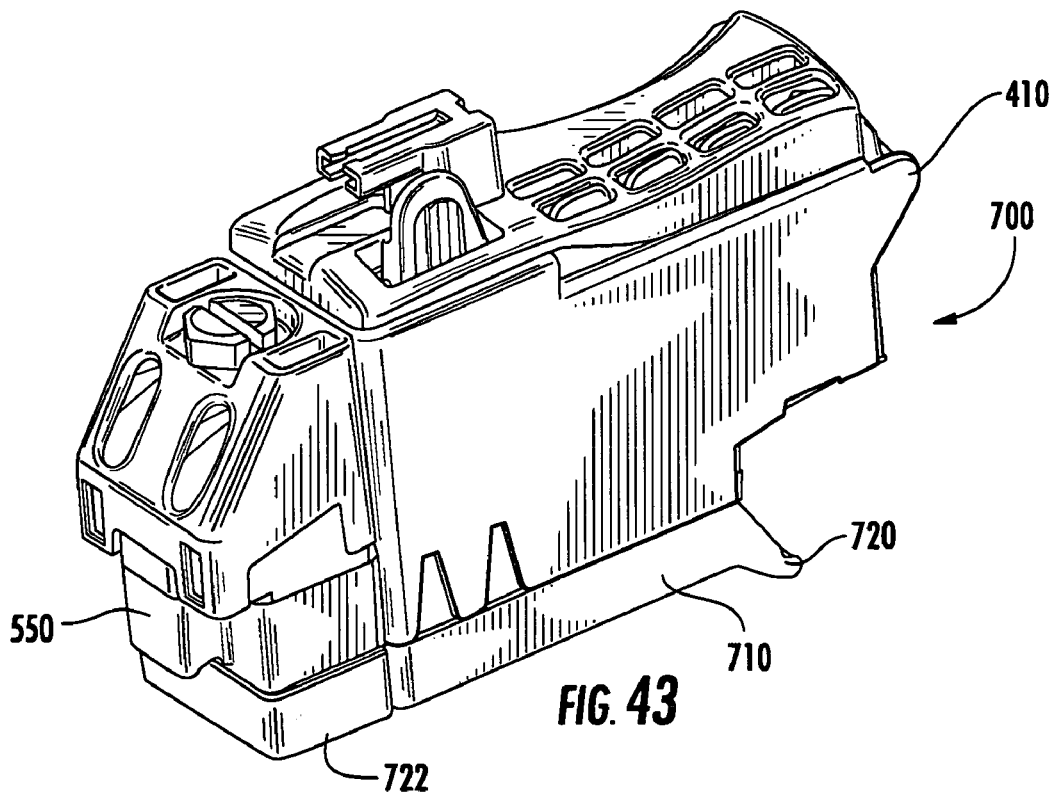
FIG. 43 illustrates the PLM with an adapter that enables the PLM to fit with an NI-2000 series PTD.

FIG. 43 illustrates the PLM 700 with an adapter 710 that enables PLM 700 to fit with an NI-2000 series PTD commercially available from Corning Cable Systems LLC of Hickory N.C., hereinafter "CCS". The adapter 710 includes a rearwardly and downwardly extending connection section 720 which mates with structure in the NI-2000 series PTD. The adapter 710 also includes a section which attaches to module 550 and allows for the storage of subscriber wire in section 722.

Figure 44:
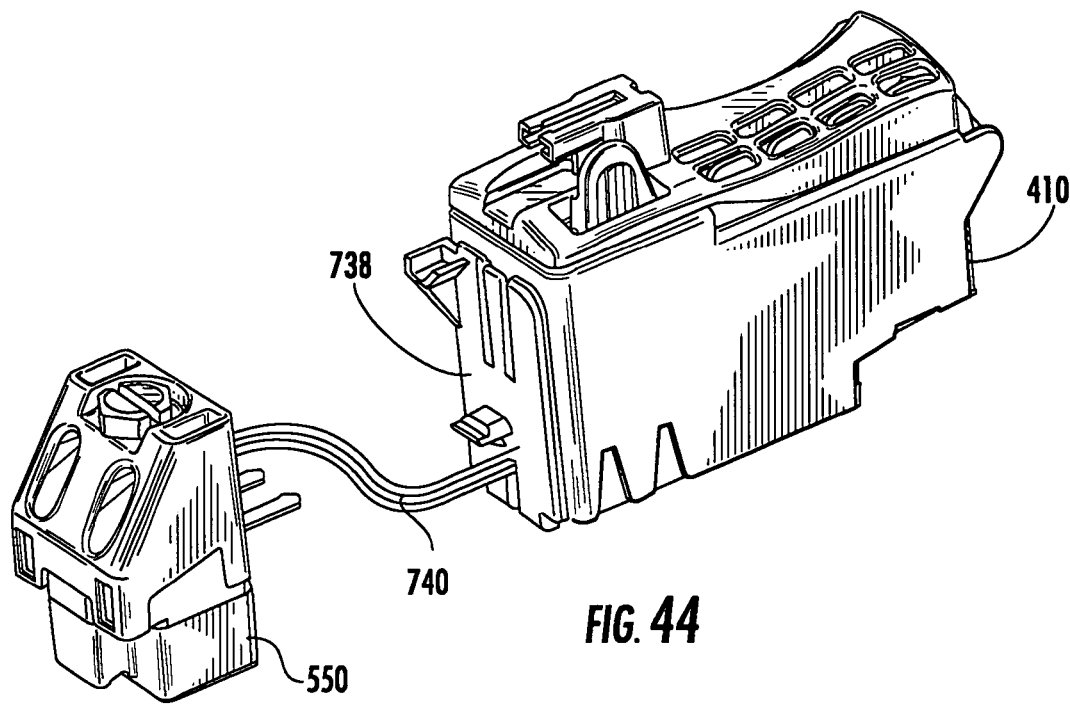
FIG. 44 illustrates the SLM with the module remotely coupled to the SLM via subscriber wires.

FIG. 44 illustrates SLM 410 with module 550 remotely coupled to SLM 410 via subscriber wires 740. A SLM adapter 438 is mounted to a side of the SLM 410. The SLM 410 as shown in FIG. 44 is attachable to a CAC® 7600 NID, a CAC® 9600 NID, a CAC® 7900 NID, and a CAC® 5000 NID, all commercially available from CCS.

Figure 45:
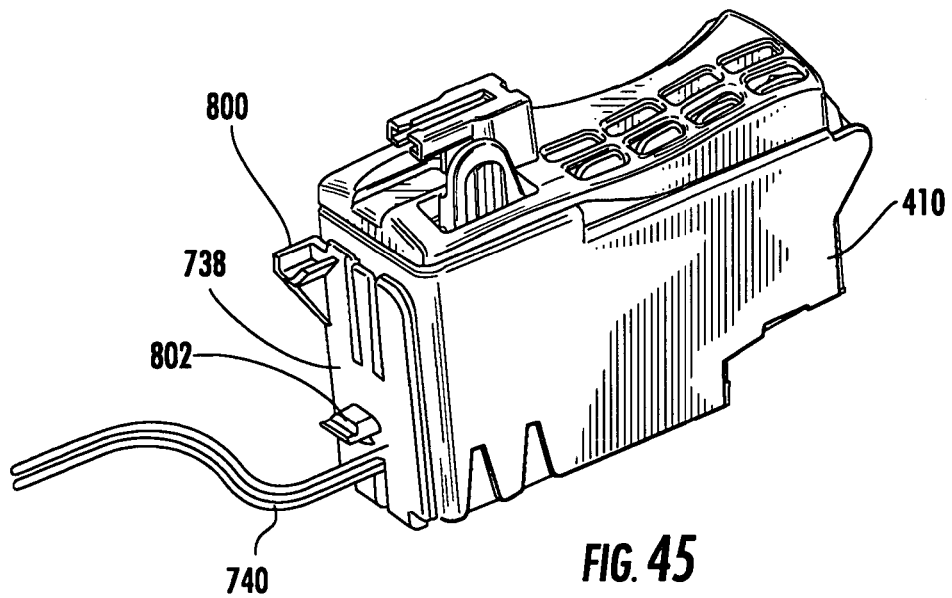
FIG. 45 illustrates the SLM without the module remotely coupled to the SLM.

FIG. 45 illustrates SLM 410 without module 550 remotely coupled to SLM 410. A SLM adapter 438 is mounted to a side of the SLM 410, and subscriber wires 740 extend from adapter 738. The wires may or may not be connected to an adapter or to a subscriber directly. The SLM 410 as shown in FIG. 45 is attachable to the CAC® 7600 NID, the CAC® 9600 NID, the CAC® 7900 NID, and the CAC® 5000 NID, all commercially available from CCS. Adapter 738 has, in one embodiment, a channel shaped member 800 and a mating member 802 such that adapter 738 facilitates connecting SLM 410 to another device with corresponding structure, such as, for example, module 550.

Figure 46:
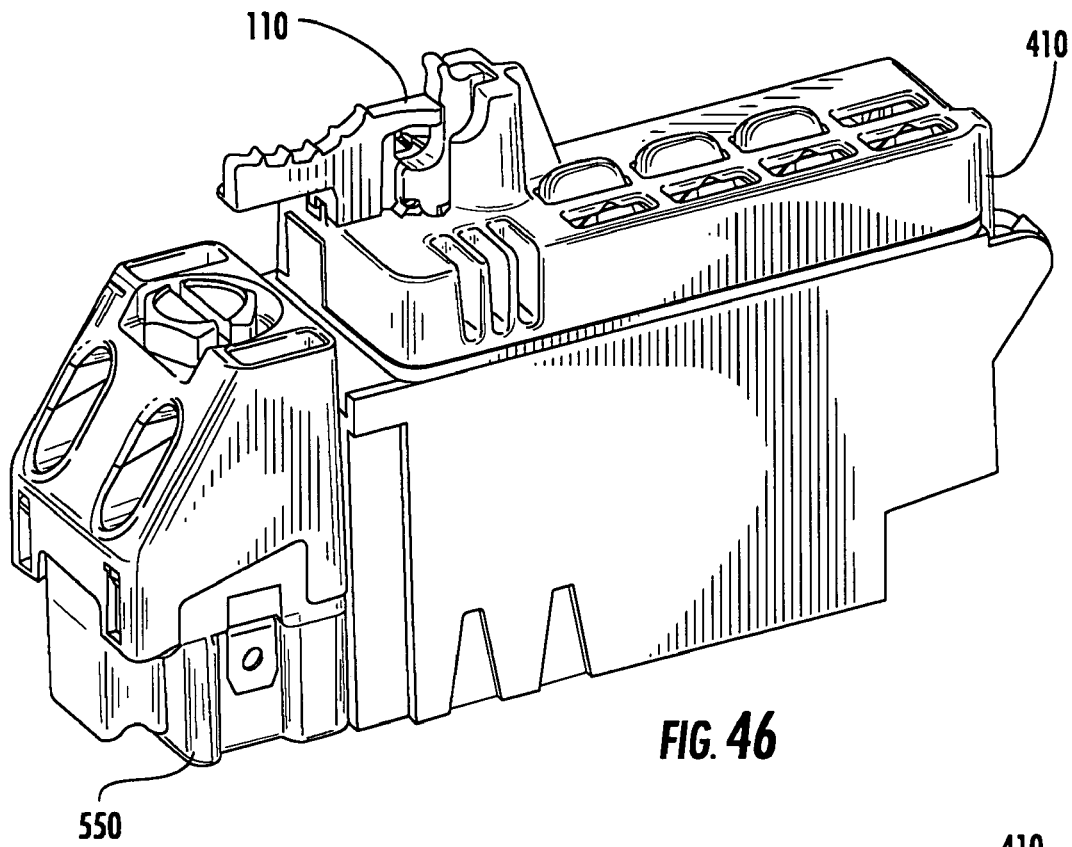
FIG. 46 illustrates the SLM 410 in combination with the module and a locking assembly.

FIG. 46 illustrates SLM 410 in combination with module 550 and locking slider 110. Note that in FIGS. 46-51, the SLM 410 does not use the SLM adapter 438 shown in FIGS. 44-45.

Figure 47:
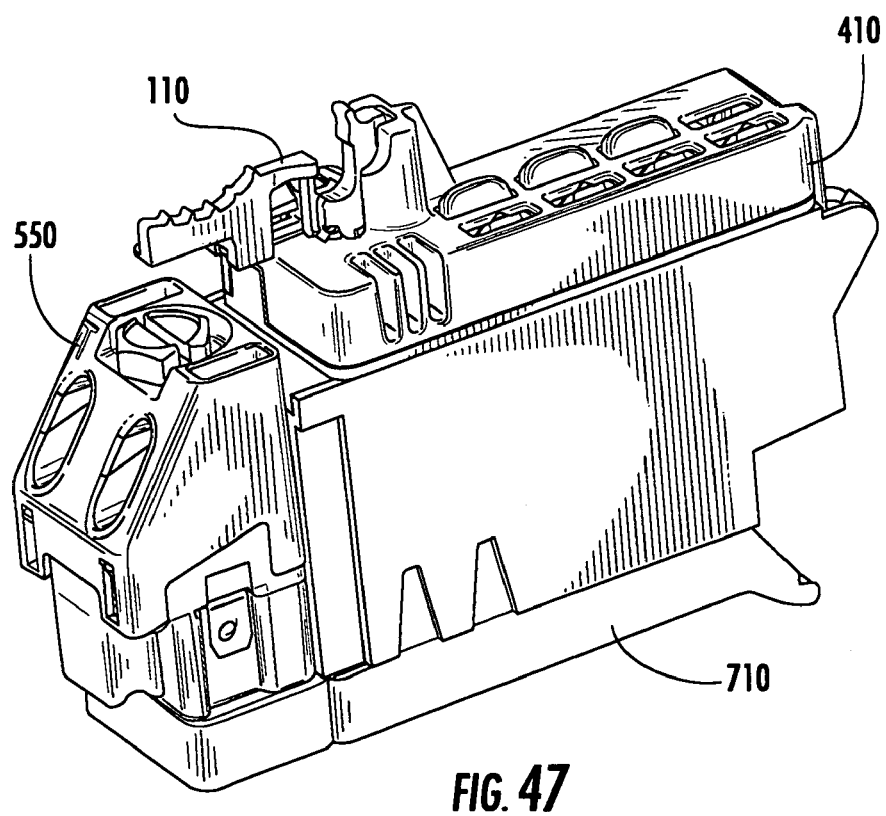
FIG. 47 illustrates the SLM in combination with the module, the locking assembly, and the adapter.

FIG. 47 illustrates SLM 410 in combination with module 550, locking slider 110, and adapter 710.

Figure 48:
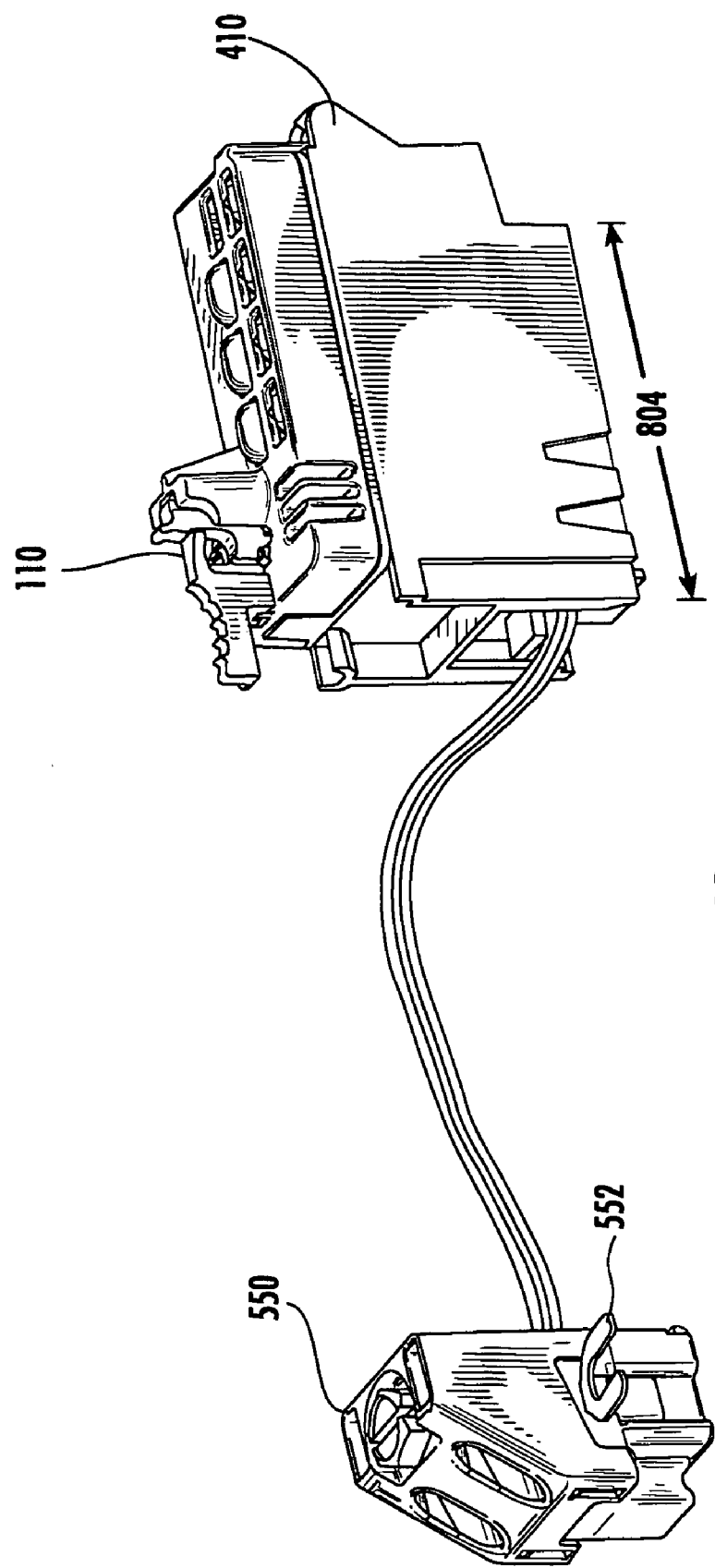
FIG. 48 illustrates the SLM with the module remotely coupled to the SLM via subscriber wires.

FIG. 48 illustrates SLM 410 with module 550 remotely coupled to SLM 410 via subscriber wires 740. Note module 550 has a ground adapter 552. The SLM 410 and module 550 as shown in FIG. 48 is attachable to the CAC® 9600 NID, the CAC® 7900 NID, and the CAC® 5000 NID, all commercially available from CCS.

Figure 49:
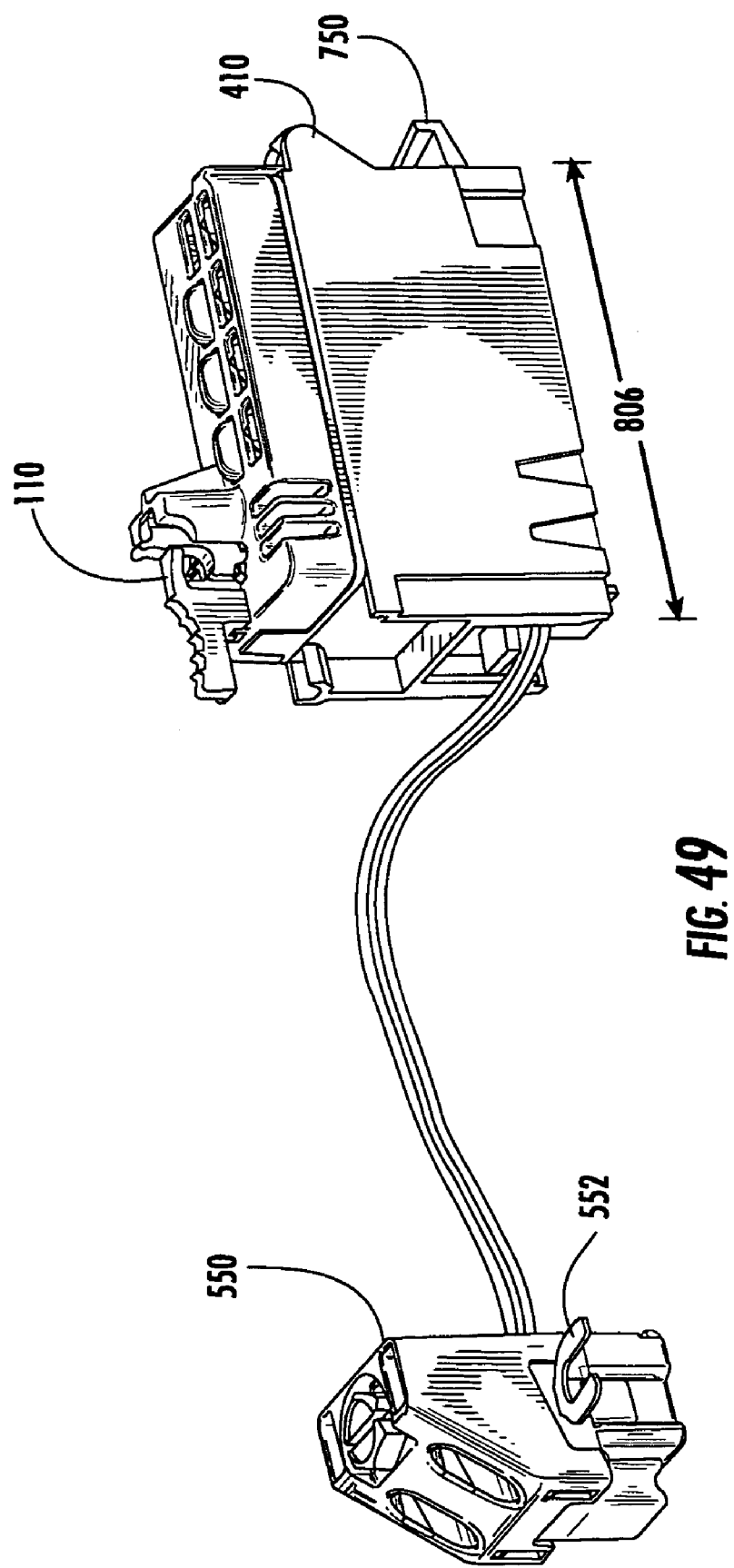
FIG. 49 illustrates the SLM with the module remotely coupled to the SLM via subscriber wires.

FIG. 49 illustrates SLM 410 with module 550 remotely coupled to SLM 410 via subscriber wires 740. Note module 550 has a ground adapter 552 and SLM 410 includes an attachment clip 750. The SLM 410 and module 550 as shown in FIG. 49 is attachable to the CAC® 7600 NID, commercially available from CCS. Note that SLM has a base length 804 in FIG. 48 and a base length 806 in FIG. 49, wherein length 804 is less than length 806. These different base lengths allow the SLM 410 to be mounted in different NID configurations.

Figure 50:
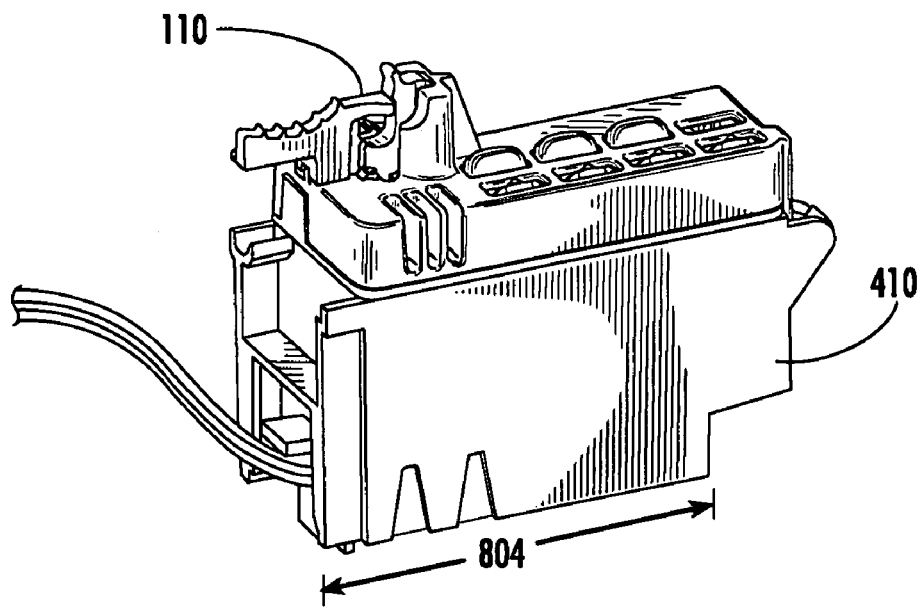
FIG. 50 illustrates the SLM without the module remotely coupled to the SLM.

FIG. 50 illustrates SLM 410 without module 550 remotely coupled to SLM 410. The SLM 410 as shown in FIG. 50 is attachable to the CAC® 9600 NID, the CAC® 7900 NID, and the CAC® 5000 NID, all commercially available from CCS.

Figure 51:
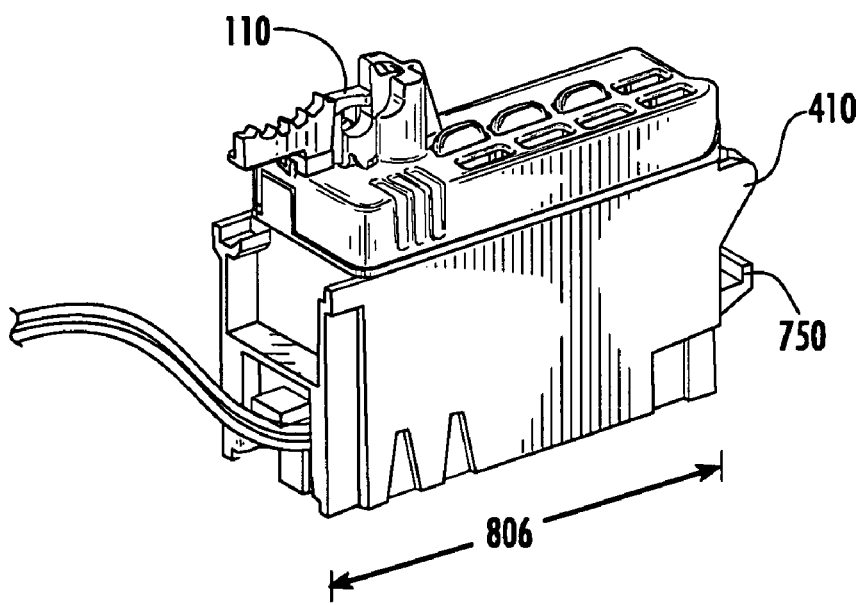
FIG. 51 illustrates the SLM without the module remotely coupled to the SLM.

FIG. 51 illustrates SLM 410 without module 550 remotely coupled to SLM 410. Note SLM 410 includes an attachment clip 750. The SLM 410 as shown in FIG. 51 is attachable to the CAC® 7600 NID, commercially available from CCS.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A line module comprising:
   a plurality of actuating arms;
   an insulation displacement connector (IDC) positionable in at least one actuating arm when said actuating arm is in a connected position; and
   a gel-less jack in electrical communication with at least one IDC.

2. A line module in accordance with claim 1 wherein each IDC comprises a subscriber wire portion and a provider wire portion, wherein each provider wire portion extends into a provider wire routing area of said module and a potting material is in said provider wire routing area.

3. A line module in accordance with claim 1 wherein each IDC comprises a subscriber wire portion and a provider wire portion, wherein each provider wire portion is permanently coupled to a provider wire and each subscriber wire portion is configured for removably field coupling to a subscriber wire.

4. A line module in accordance with claim 1 wherein each actuating arm comprises a curved section to facilitate positioning said IDC in said actuating arm.

5. A line module in accordance with claim 1 wherein each actuating arm comprises two curved sections in an offset configuration to facilitate positioning two IDCs in said actuating arm at different levels.

6. A line module in accordance with claim 1 further comprising a rotating connection member which is rotated when a cover is closed or open to make or break respectively an electrical connection between a subscriber wire and a provider wire.

7. A line module in accordance with claim 6 wherein when said rotating connection member is rotated to make or break respectively an electrical connection between the subscriber wire and the provider wire, the rotation also breaks or makes respectively an electrical connection between the provider line and said gel-less jack.

* * * * *